US011507859B2

(12) United States Patent
Stromer-Galley et al.

(10) Patent No.: US 11,507,859 B2
(45) Date of Patent: Nov. 22, 2022

(54) TRACKABLE REASONING AND ANALYSIS FOR CROWDSOURCING AND EVALUATION

(71) Applicants: COLORADO STATE UNIVERSITY RESEARCH FOUNDATION, Fort Collins, CO (US); Syracuse University, Syracuse, NY (US); The Arizona Board of Regents on Behalf of the University of Arizona, Tucson, AZ (US)

(72) Inventors: Jennifer Stromer-Galley, Cazenovia, NY (US); Brian McKernan, East Meadow, NY (US); Patricia Rossini, Liverpool (GB); Carsten Oesterlund, Syracuse, NY (US); Lael Jeremy Schooler, Fayetteville, NY (US); James Eric Folkestad, Fort Collins, CO (US); Benjamin Clegg, Timnath, CO (US); Rosa Mikeal Martey, Fort Collins, CO (US); Kate Marian Kenski, Tucson, AZ (US); Roc Aron Myers, Ashburn, VA (US); Sarah M. Taylor, Sedgwick, ME (US)

(73) Assignees: COLORADO STATE UNIVERSITY RESEARCH FOUNDATION, Fort Collins, CO (US); Syracuse University, Syracuse, NY (US); The Arizona Board of Regent on Behalf of the University of Arizona, Tucson, AZ (US)

( * ) Notice: Subject to any disclaimer, the term of this patent is extended or adjusted under 35 U.S.C. 154(b) by 506 days.

(21) Appl. No.: 16/737,799

(22) Filed: Jan. 8, 2020

(65) Prior Publication Data
US 2020/0218996 A1     Jul. 9, 2020

Related U.S. Application Data

(60) Provisional application No. 62/789,980, filed on Jan. 8, 2019.

(51) Int. Cl.
*G06F 7/00*     (2006.01)
*G06N 5/04*     (2006.01)
(Continued)

(52) U.S. Cl.
CPC ............... *G06N 5/04* (2013.01); *G06N 5/003* (2013.01); *G06N 7/005* (2013.01)

(58) Field of Classification Search
CPC .... G06N 5/04; G06Q 10/0633; G06Q 10/103; G01N 33/0004; G06F 17/10; G06F 17/18; G06F 7/588
See application file for complete search history.

(56) References Cited

U.S. PATENT DOCUMENTS

| 7,720,780 B1 | 5/2010 | Heidenreich et al. |
| 8,280,838 B2 | 10/2012 | Ferrucci et al. |

(Continued)

*Primary Examiner* — Insa Sadio
(74) *Attorney, Agent, or Firm* — Maschoff Brennan; Paul G. Johnson

(57) ABSTRACT

In an example, a computer-implemented method to structure an analytical workflow that improves reasoning based on a problem context and demonstrated abilities of each individual user may include displaying a reasoning problem to an analyst. The method may include receiving input from the analyst to identify a reasoning problem type of the reasoning problem. providing a recommended analytic approach for the reasoning problem type to the analyst. The method may include assisting the analyst in analyzing and evaluating one or more information sources relevant to the reasoning problem. The method may include guiding the analyst through a structured technique (ST) to support reasoning of the analyst in formulation of a solution to the reasoning problem. The (Continued)

method may include generating a report that includes the analyst's solution to the reasoning problem based on input from the analyst.

20 Claims, 17 Drawing Sheets

(51) Int. Cl.
    *G06N 7/00*     (2006.01)
    *G06N 5/00*     (2006.01)

(56) References Cited

U.S. PATENT DOCUMENTS

| | | |
|---|---|---|
| 8,966,569 B2 | 2/2015 | Schwartz et al. |
| 9,153,142 B2 | 10/2015 | Bagchi et al. |
| 9,177,049 B2 | 11/2015 | Wright et al. |
| 9,461,876 B2 | 10/2016 | Van Dusen et al. |
| 10,395,216 B2 | 8/2019 | Coffing |
| 2013/0006717 A1* | 1/2013 | Oleson .................. G09B 19/00 705/7.41 |
| 2014/0344191 A1 | 11/2014 | Lebow |
| 2016/0148159 A1 | 5/2016 | Coffing |
| 2017/0309193 A1* | 10/2017 | Joseph .................. G09B 5/02 |
| 2018/0053114 A1 | 2/2018 | Adjaoute |
| 2018/0329865 A1 | 11/2018 | Jones |

\* cited by examiner

TRACE — Guided Analysis

Timeline | Discussion | Notes

Problem: Use The Information Provided To Identify Individual(s) Named AB Lovell, Associated With The Crime That Happened At Julia Howser's House — 902

Background | Evaluation | Network | % Bayesian | Checklist | Tags — 904

Generating Possible Hypotheses

Step 1: Write Out A Clear, possible Hypothesis For The Problem You Are Analysing Based On Your Understanding Of The Task.

Step 2: Write Out Two Other Possible Hypotheses That Are Significantly Different From Your Original Hypothesis. Propose Sufficiently Different Combinations Of People, Mechanisms, or Events. (You Will Be Able To Generate More Than Three Later.)

Step 3: Check Your Hypothesis For Testability.

For Example, These Are Not Testable:
- The Smartest Way To Attack Is By Sea.
- The Japanese Should Attack By Sea.
- The Attack Will Be By Sea If The Japanese Feel Like It.

- A.B. Lovell Is Abigail Lovell  ✕
- A.B. Lovell Is Arthur Lovell  ✕
- A.B. Lovell Is Alejandro Lovell  ✕
- A.B. Lovell Is Jacqueline Lovell  ✕
- A.B. Lovell Is Lucille Lovell  ✕

[Add Hypothesis]

[Use Wizard]  [Evaluate Hypotheses]

---

Sources | Report

Jump To: Results Of White Pages Search For A. Lovells In This Part Of Central Florida ▼  5 / 11 Viewed Relevance: ☆☆☆☆☆ — 906

Filter By City
- Apopka, FL (10-50)
- Bradenton, FL (10-50)
- Cape Coral, FL (10-50)
- Clearwater, FL (10-50)
- Daytona Beach, FL (10-50)
- Deltona, FL (10-50)
- Dunnellon, FL (10-50)
- Fernandina Beach, FL (10-50)

Lucille Lovell
Age 46 | 415 Horatio Pl., Lakeland FL
(813) 273-4462
[View Details]

Alejandro B. Lovell
Age 31 | 5725 Lake Blvd., Orlando, FL
(863) 564-2121
[View Details]

Jacqueline Lovell
Age 29 | 5725 Lake Blvd., Orlando, FL
(863) 564-2121
[View Details]

Last Saved: A Few Seconds Ago

Need Help? Contact Use At: trace@syr.edu

TRACKABLE REASONING AND ANALYSIS FOR CROWDSOURCING AND EVALUATION

CROSS-REFERENCE TO RELATED APPLICATION

This application claims the benefit of and priority to U.S. Provisional Application No. 62/789,980 filed on Jan. 8, 2019. The 62/789,980 application is incorporated herein by reference.

FEDERALLY SPONSORED RESEARCH AND DEVELOPMENT

This invention was made with Government support through the Department of Intelligence, Grant No. 2017-16121900004. The government has certain rights in the invention.

FIELD

The embodiments discussed herein are related to methods and systems to structure analytical workflows to improve reasoning based on problem context and user abilities.

BACKGROUND

Unless otherwise indicated herein, the materials described herein are not prior art to the claims in the present application and are not admitted to be prior art by inclusion in this section.

Crowdsourcing and collaboration platforms depend on two principle types of data to be productive: direct contributions from members; and opportunistic or mediated data aggregated from a crowd. To ensure the quality of these contributions in the context of decision-making, crowdsourcing platforms need to support crowd workers who are tasked with complex reasoning and decision-making in a way that does not overwhelm them with extrinsic cognitive load or lead them to reasoning and decision-making that is influenced by problematic cognitive biases.

Traditional organizations often deal with the issues of cognitive load and bias through the use of decision support systems tailored to managerial users. Such decision support systems may help a small group of people recognize problems, develop analytical syntheses, as well as identify and understand the consequences of potential solutions. Recently, some organizations have employed crowdsourcing as a strategy to support managerial decision making, problem-solving, and opportunity exploration by generating ideas, proposing solutions, or evaluating alternatives by the crowds. In short, organizations have started to focus on how to leverage crowds to best support managerial requesters in formal decision-making. One thing missing in such decision support systems is a framework to support the reasoning and decision processes of the managerial users when they engage with work generated from the crowd.

Accurate reasoning does not always occur even when people are asked to address what might appear to be simple problems. A variety of factors can undermine one's reasoning ability, including a general tendency to reach decisions using heuristics that although sometimes effective can also lead to systematic errors known as cognitive biases. Additional challenges to accurate and high-quality reasoning include people's inflated and mis-calibrated self-assessment due to the lack of metacognitive skill, and memory failures due to cognitive load. Although scholars have argued that seeking input from members of a group can potentially improve reasoning and the decision-making process, crowdsourcing platform designers still face the challenge of providing the appropriate reasoning and decision-making support. Moreover, recent research has revealed that crowds can be susceptible to some of the same cognitive biases as individuals.

Moreover, intelligence analysts have long encountered issues with cognitive biases. Although intelligence community (IC) studies point to significant problems with cognitive biases, solutions are rarely implemented or systematically monitored for efficacy. Structured Analytic Techniques or Structured Techniques, commonly referred to as STs, have been employed by the IC but rarely provide more than general process checks and to date the STs used by the IC are not context sensitive, while analysts' instinctive reasoning are situated in context. STs are "procedures for reducing the frequency and severity of error". Typical STs include devil's advocacy, brainstorming, and Analysis of Competing Hypotheses (ACH). Although STs have shown promise in various contexts, some debate their effectiveness, which varies depending on the specific type of problem and implementation of the procedure. Moreover, STs are usually tested and implemented with individuals or teams by the IC. This places a large cognitive burden on analysts to force the problem context to the structure of the technique.

Crowd techniques offer an opportunity to support analysts' instinctual reasoning processes without adding significant cognitive load, which not only detracts from the analysis and report-writing process, but also increases the amount of time needed to complete these processes. A crowdsourcing system is defined as a type of information system that leverages crowds to produce products and services for external or internal customers. Since their emergence, crowdsourcing systems have been used by organizations or individual requesters to deal with different types of problems ranging from knowledge discovery to distributed human intelligence tasks. A common misconception about crowd-based problem solving is it only works well when dealing with non-complex problems. Recent studies, however, demonstrate that crowds can be leveraged to solve complex and collaborative tasks as well, such as writing fictional stories, generating competing ideas as well as proposals to manage climate change, and even contributing to making judgments and decisions.

Crowdsourcing systems rely on multiple organizational schemes. For example, a typology may include four types of crowdsourcing systems: (1) crowd processing, (2) crowd rating, (3) crowd-solving, and (4) crowd creation. Crowd processing relies on homogenous contributions that meet predefined specifications and evaluation standards. Contributions are non-emergent which means they will come from individual crowd workers without any aggregation. Vizwiz is an example of this crowdsourcing system type. Crowd rating relies on homogenous contributions from multiple workers. In other words, final output depends on the work of several individual crowd workers (e.g., an aggregated rating). The eBay reputation system is an example of this crowdsourcing type. Crowd-solving relies on heterogeneous contributions from multiple workers (e.g., the generation of different and alternative solutions to a problem). In other words, worker contributions are independent of each other. 99designs.com is an example in this category. Crowd creation relies on heterogeneous and emergent contributions and results in a final output that is distinct from the inputs. Wikipedia is an example in this category.

The foundation for the typologies of crowdsourcing above is a central organizational scheme which partitions a problem into sub-problems or divides a task into subtasks to be handled by crowd workers. Subsequently, there is a need to aggregate the resulting or mini-contributions in a meaningful way at appropriate junctures in the task completion process. Partitioning a large problem into smaller units and then aggregating crowd contributions is not a trivial task. For sites such as Wikipedia that rely on crowd creation, the organization of crowd work sometimes leads to editing wars where participants repeatedly overwrite each other's work. Sites relying on crowd ratings face issues with emerging and unruly labeling of work, spelling variations, the use of acronyms and synonyms, and varying terms used to describe overlapping phenomena.

In short, it can be burdensome to develop an organizing scheme that effectively and appropriately partitions and aggregates crowdsourced work. This is particularly true for highly dynamic work environments such as the IC where the problems context and analytic tasks may change quickly As it stands, more research on organizational features that may strengthen STs' efficacy in large groups and crowd settings is needed to design crowdsourcing-based intelligence analysis system that can make collaborative reasoning more effective. In short, the IC faces a dilemma in how to best support analysts' reasoning and analysis. On the one hand, forcing them to use STs may improve the quality of their reasoning, but experience shows that STs' effects are contextual and debatable. On the other hand, unstructured, laissez-faire approaches in intelligence analysis may increase the likelihood of analysts succumbing to various cognitive biases and thus impacting their analytic procedures and products.

The subject matter claimed herein is not limited to implementations that solve any disadvantages or that operate only in environments such as those described above. Rather, this background is only provided to illustrate one example technology area where some implementations described herein may be practiced.

SUMMARY

There is a need in the art for an approach that can deal with the foregoing dilemma by, e.g., combining the wisdom of the crowd and modified STs together.

Some embodiments described herein include an analytic and/or crowdsourcing platform that may be referred to herein as a Trackable Reasoning and Analysis for Collaboration and Evaluation system or TRACE system. These and other embodiments may facilitate stigmergic coordination and communication from crowd workers and/or may support reasoning and decision making. The TRACE system may integrate crowdsourcing and STs to strengthen intelligence analysts' reasoning and decision-making processes as well as improve the decisions that analysts and their customers make based on those processes.

To overcome some of the challenges associated with partitioning and aggregating crowd work, the TRACE system may rely on stigmergic coordination, which is defined as a process by which one individual affects the behavior of others through changes in the shared environment. For example, ants follow scent trails to food previously found by other ants, thus assigning labor to the most promising sources. Organized collective action emerges from the interaction of individuals and the evolving environment rather than a shared plan. In other words, individuals build their own work on the traces left behind by other participants' contributions.

While stigmergy was formulated to explain the behavior of social insects following simple behavioral rules, it has also been invoked to explain classes of human activity. A bricklayer working on a wall may not need to explicitly coordinate his work with a colleague before going on holiday. His fellow bricklayer can examine the patterns of bricks form the incomplete wall to determine where to place the next brick. As such, shared work itself can be a coordination mechanism. Christensen observed this type of coordination among architects, noting that their work is "partly coordinated directly through the material field of work . . . in addition to relying on second-order coordinative efforts (at meetings, over the phone, in emails, in schedules, etc.), actors coordinate and integrate their cooperative efforts by acting directly on the physical traces of work previously accomplished by themselves or others". Christensen, L. R., The logic of practices of stigmergy: representational artifacts in architectural design. In *Proceedings of the* 2008 *ACM conference on Computer supported cooperative work* (pp. 559-568), November 2008.

The stigmergic form of crowd work allows participants to build on one another's contributions without explicit coordination among collaborators or the division of labor into discrete steps and responsibilities. But stigmergy does not mean that individuals uncritically mimic the actions of other participants. If a large number of people work on the same problem, individuals will have a range of sub-tasks from which to select. These features make stigmergic coordination particularly promising for the IC because it may allow analysts to neutralize the impact of inaccurate, weak, or unreliable submissions (perhaps from sabotage) by giving them the ability to choose from a pool of contributions.

The TRACE system may include a web-based application that provides a set of analytic techniques and crowdsourced information to support quality reasoning and effective communication of assessments. The TRACE system may generate transparent and accurate reasoning to support decision-makers. The TRACE system may build on what humans do naturally, may foster creativity, and may provide support and guidance where human reasoning and reporting falls short.

In an example embodiment, a computer-implemented method to structure an analytical workflow that improves reasoning based on a problem context and demonstrated abilities of each individual user may include displaying a reasoning problem to an analyst. The method may include receiving input from the analyst to identify a reasoning problem type of the reasoning problem. providing a recommended analytic approach for the reasoning problem type to the analyst. The method may include assisting the analyst in analyzing and evaluating one or more information sources relevant to the reasoning problem. The method may include guiding the analyst through a structured technique (ST) to support reasoning of the analyst in formulation of a solution to the reasoning problem. The method may include generating a report that includes the analyst's solution to the reasoning problem based on input from the analyst.

In another example embodiment, a computer-implemented method to structure an analytical workflow that improves reasoning based on a problem context and demonstrated abilities of each individual user may include displaying a reasoning problem to an analyst. The method may include receiving input from the analyst to identify a reasoning problem type of the reasoning problem. The method may include providing a recommended analytic approach for the reasoning problem type to the analyst. The method may include facilitating stigmergic communication among multiple analysts that includes the analyst while at least one of: assisting the analyst in analyzing and evaluating one or more information sources relevant to the reasoning problem; guiding the analyst through an ST to support reasoning of the analyst in formulation of a solution to the reasoning problem; and generating a report that includes a solution to the reasoning problem based on input from one or more of the analysts.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 8 illustrates a fourth example TRACE system GUI;

FIG. 9 illustrates a fifth example TRACE system GUI;

FIG. 10 illustrates the GUI of FIG. 9 after selection of a "Reports" tab of FIG. 9;

FIG. 11 illustrates the GUI of FIG. 9 after loading a different information source than in FIG. 9;

FIG. 12 illustrates the GUI of FIG. 9 after both selection of an "Evaluation" tab of FIG. 9 and loading a different information source than in FIG. 9;

FIG. 14 illustrates the GUI of FIG. 9 after selection of a "Timeline" tab of FIG. 9;

FIG. 16 illustrates the GUI of FIG. 9 after selection of a "Discussion" tab of FIG. 9;

DETAILED DESCRIPTION OF SOME EXAMPLE EMBODIMENTS

Figure 1:
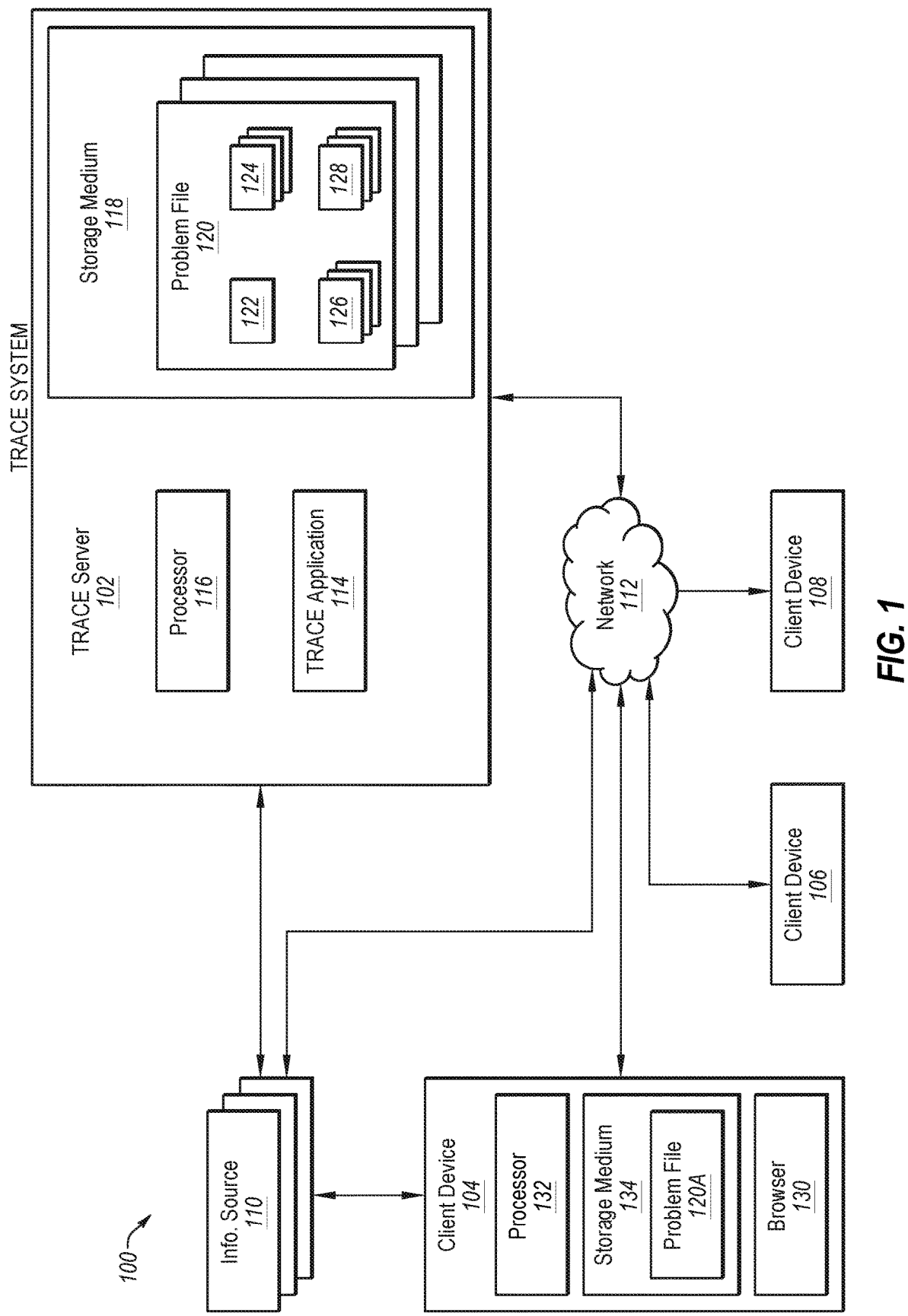
FIG. 1 is a block diagram of an example operating environment in which an example TRACE system may be implemented.

Example embodiments described herein relate to methods and systems to structure analytical workflows that improve average user reasoning by dynamically constructing the workflow based on problem context and demonstrated abilities of each user. In general, an example TRACE system may receive a reasoning problem, e.g., from a customer, and display the reasoning problem to an analyst or other user. The user may review the reasoning problem and identify a reasoning problem type of the reasoning problem. Example reasoning problem types include pro vs. con; bayesian; statistical, financial, or quantitative; individual entities, relationships, organizations, or networks, probability assessments; geospatial or temporal; and motivations or forecasting. The TRACE system may then provide a recommended analytic approach for the reasoning problem type to the user. The recommended analytic approach may include various tools to address the reasoning problem, such as one or more recommended STs. The user may accept or reject some or all of the recommended analytic approach. The TRACE system may assist the user in analyzing and evaluating one or more information sources relevant to the reasoning problem. The TRACE system may guide the user through one or more STs to support reasoning of the user in formulation of a solution to the reasoning problem. The ST through which the TRACE system guides the user may include one or more recommended STs included in the recommended analytic approach and/or one or more other STs selected by the user. The TRACE system may then generate a report that includes the user's solution to the reasoning problem based on input from the user.

In some embodiments, the TRACE system may facilitate stigmergic communication among multiple users while assisting the user in analyzing and evaluating the information sources, guiding the user through the ST, and/or generating the report. Facilitating stigmergic communication may include aggregating and displaying to the user evaluation input and/or ST input from other users while the user is analyzing and evaluating the information sources and/or while the user is being guided through the ST. A group of two or more users may work together with their respective input being shown to the other in real time. Alternatively or additionally, input from users may be aggregated over time and displayed subsequently to the user.

In at least one embodiment, a TRACE system as described herein allows users to perform a variety of actions designed to enhance reasoning In particular, the TRACE system may allow users to perform one or more of the following: (1) view different information sources potentially relevant to the analytical task; (2) add tags and/or other annotations to the information sources; (3) communicate with other users about source annotations; (4) generate hypotheses; (5) debate the pros and cons of each hypothesis; (6) document any assumptions that could color the analysis;

and (7) evaluate validity and alternative hypotheses. The TRACE system is thus designed to enhance user's ability to reason and explain their judgment by combining modified STs with a stigmergic form of crowdsourcing.

The evaluation of information resources constitutes a critical task in evidence-based reasoning. Intelligence analysis is often a non-sequential three-step process of (1) sensemaking, (2) critical evaluation, and (3) synthesis of available information. To help reasoners process and understand information from multiple information sources, the TRACE system may enable users to highlight, comment, tag, and/or otherwise annotate information sources. For example, the tagging feature is designed to help reasoners identify and categorize critical pieces of information. It nudges them to think about actors, events, facts, and assumptions. The commenting feature is designed to aid sensemaking by helping users connect their opinions and insights to the available data. Additionally, these are the types of user-generated material that the TRACE system may make accessible to other users in the crowd, thus allowing them to extend their own analysis through stigmergic input from other's labor.

At the core of the crowdsourcing-supported reasoning of the TRACE system is the ability to provide users with a stigmergic awareness of work contributed by others. In particular, the TRACE system may provide users with access to how others have used the TRACE system to complete key or challenging aspects of the reasoning process for the same case or problem that the user is currently analyzing. Doing so may provide one or more of the following advantages: (1) Users may find particular parts of the reasoning process challenging or cognitively demanding, such as generating alternative hypotheses or identifying and considering key assumptions they have made which may influence their analyses. Whereas such challenges may prove insurmountable for someone working independently access to crowd information allows users to build upon others' work and incorporate these insights into their analysis. (2) Exposure to others' work may encourage a user to reconsider certain aspects of his or her reasoning process and thus help mitigate certain cognitive biases. For example, users' exposure to others' hypotheses and justifications may help them re-evaluate their final judgments and thus mitigate confirmation bias that seeks or interprets evidence that are partial to existing beliefs, expectations, or a hypothesis in hand. Additionally, users' access to how others have evaluated and annotated information sources may encourage users who pay an inordinate amount of attention to a particular piece of information while largely ignoring others to more carefully consider those other information sources and thus mitigate anchoring bias.

Keeping with stigmergic coordination, the TRACE system does not require users to share their work with others consciously. Instead, the TRACE system may automatically share pivotal aspects and/or other portions of users' analysis (e.g., hypotheses, justifications, information resource evaluations, etc.) with other users. In this way, the TRACE approach to crowdsourcing does not interfere with users' natural reasoning processes or add additional burdens beyond what is already germane to the analytical task at hand.

Figure 6:
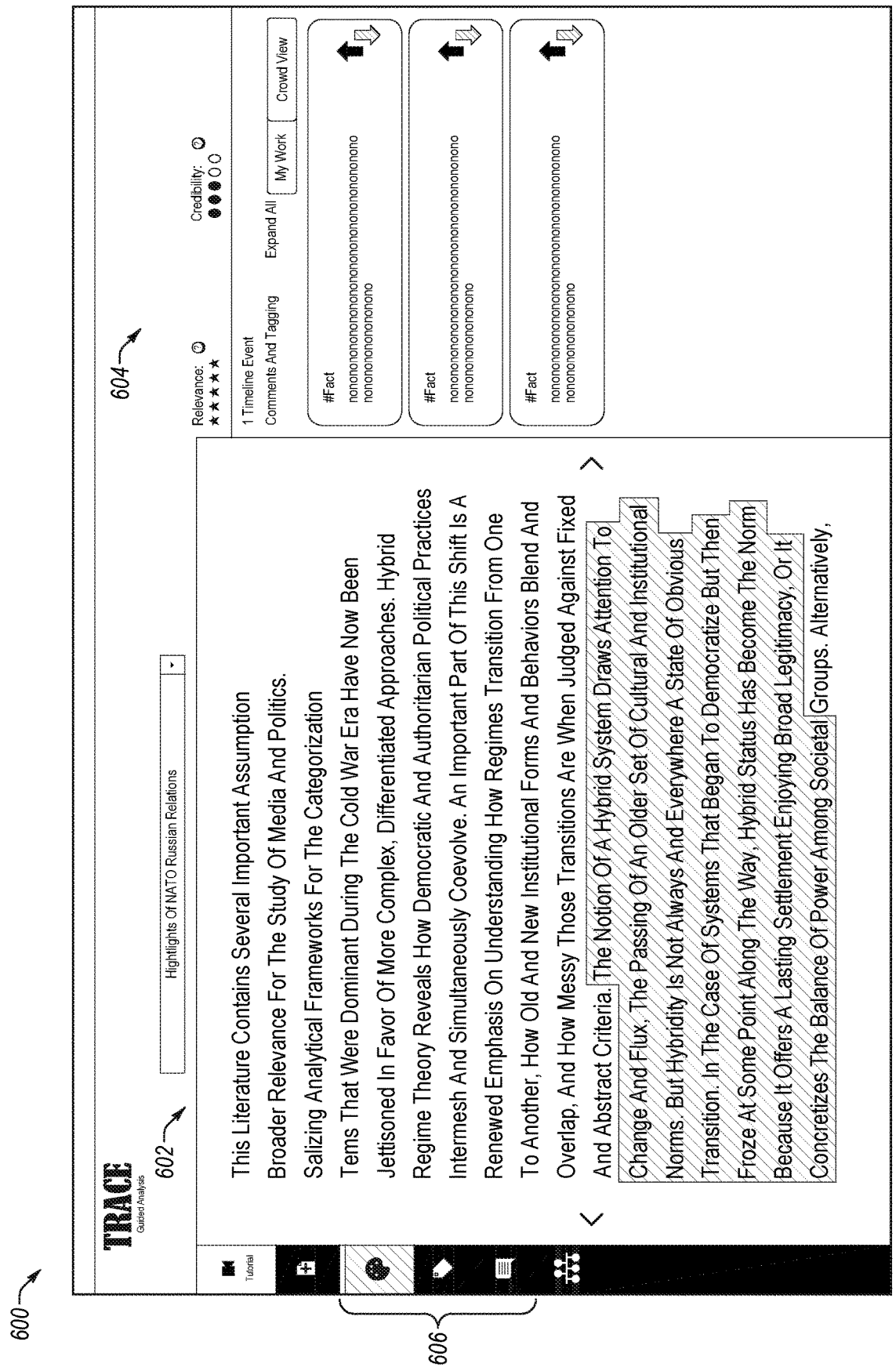
FIG. 6 illustrates a second example TRACE system GUI.

The TRACE system may include information source evaluation tools to implement this stigmergic approach. An example implementation of the tagging tool in the TRACE system is illustrated in FIG. 6 described in more detail below. The TRACE system may provide a suite of evaluation tools which help users evaluate information sources necessary for their analysis. The evaluation tools may allow users to rank the relevance and credibility of each piece of information, e.g., based on a five-point scale, and easily retrieve these rankings throughout their analysis. Additionally, the evaluation tools may include a tagging tool that allows users to highlight and annotate particular pieces of information within a resource. The tagging tool may provide four predetermined tags that can be used by each user to identify and label "actors," "assumptions," "events," and "evidence." The tagging tool may also allow the user to create and utilize custom tags. Crowdsourced tagging, e.g., tags from multiple users that have evaluated an information source, can be seen as a type of collective intelligence, and a tag selected by the majority of crowd workers (e.g., users) may embed a higher degree of collective intelligence (CI) than other methods. Hence, the tagging tool not only supports users' initial sense-making process but also enables them to organize, sort, and then easily retrieve tagged data later in the analysis.

Crowdsourced tagging may also organize the annotations of each information source in a structured and coordinated way. Traditionally, an obstacle that hinders the reasoning and comprehension of some information sources or other content is that the user-generated annotations are poorly formatted, inconsistent, or ambiguous. To address this obstacle, crowdsourced tagging may integrate a voting mechanism to select the most accepted and appreciated tags. The TRACE system may allow users to access how others have utilized the evaluation tools. The evaluation tools may also allow users to see how others evaluated the relevance and credibility of each information source. Alternatively or additionally, a consensus based approach may be used in the TRACE system where group members may agree on a final product Additionally, the tagging tool may display such evaluative information as both an average score and a distribution of crowd worker scores across, e.g., a five-point scale. The TRACE system may allow users to view how other users have tagged pieces of information in the information sources, including both annotated text and the tags applied to them. If a user finds a crowd worker's tag useful, the user can choose to import it or otherwise integrate it into the user's own work. The TRACE system may treat imported tags as a favorable vote for that particular tag and may use votes to determine the order in which to display all tags to users. For example, higher-rated tags may receive precedent on a list of crowd-sourced tags.

Prior research indicates that sociability, or the sense of being part of a valued community, is a crucial intrinsic motivator for active participants in a crowdsource project. Keeping this in mind, the approach of the TRACE system to crowdsourcing also provides users with an awareness of the community's collective work, including both what the crowd has done with the user's work as well as what the crowd has accomplished overall. This awareness gives participants a stigmergic sense of the work accomplished to date by all contributors. Just as an architect looks at an ongoing building project to assess the progress to-date, users of the TRACE system, such as intelligence analysts, may be able to gauge the progress of collective work by the contributions of the TRACE crowd.

To let users be aware of how others use their own work, the TRACE system may keep track of and notify users when their work or contributions is/are imported by another user. For example, the TRACE system may notify a first user when a second user imports the first user's tags into the second user's analysis. This feature may remind users that they are not alone in this undertaking but are instead part of a community of reasoners. Additionally, this feature may afford positive reinforcement in the form of feedback from others who found their work valuable.

In addition, prior research suggests displaying other community members' recent activities will strengthen a user's commitment to the collective. The foregoing notification feature, e.g., notifying a user when the user's prior work or contributions is/are imported by another user, may be implemented for any annotations or other input of a user that is made accessible to and/or importable by other users. Examples of such annotations or other input may include a user's tags, hypotheses, assumption checks, justifications, or other annotations or input.

Figure 7:
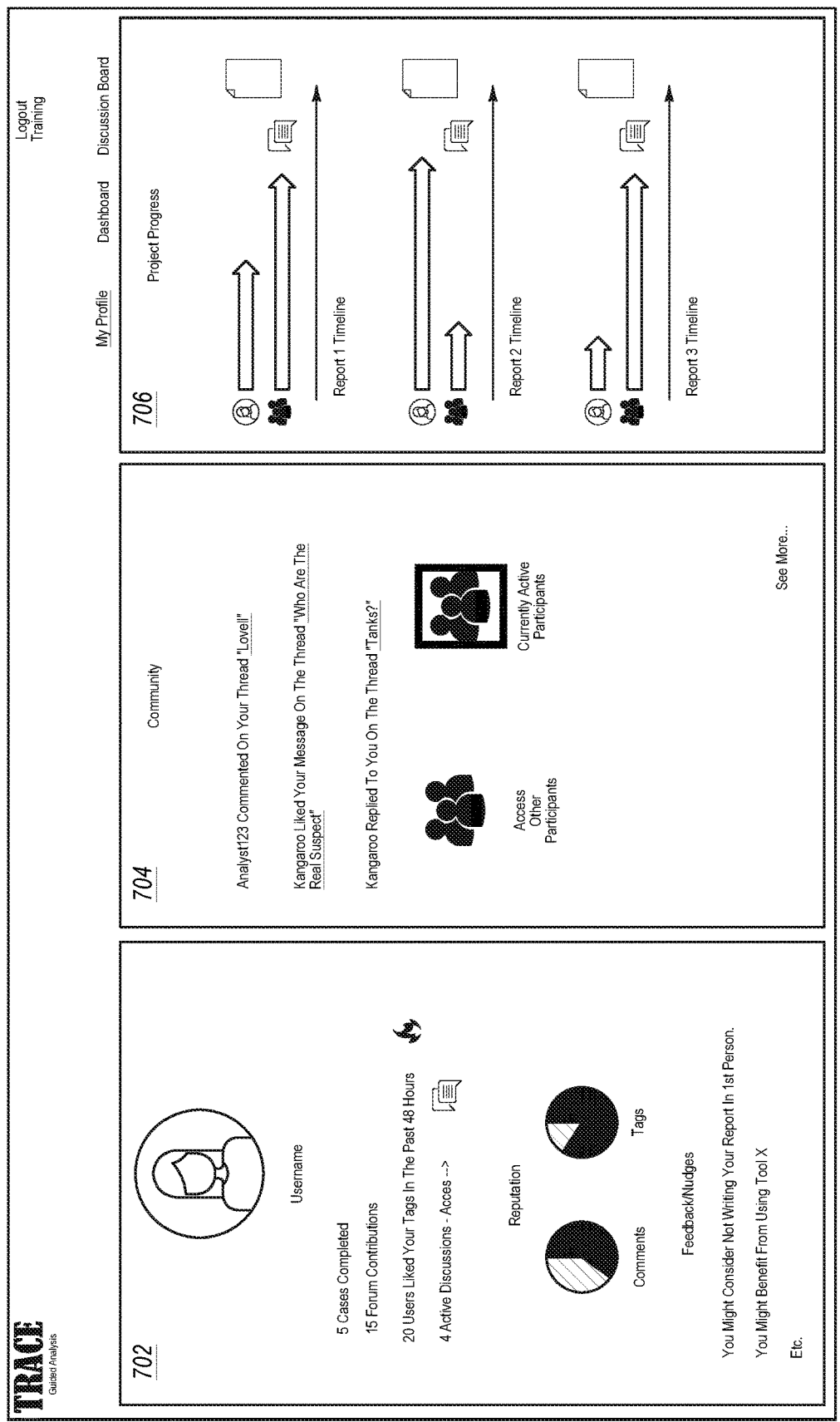
FIG. 7 illustrates a third example TRACE system GUI in the form of a home screen.

Additionally, to make users aware of the crowd's collective work, the TRACE system may provide a home screen that includes information about the crowds' aggregate contributions and accomplishments. The information may include the number of hypotheses, assumptions, and tags the crowd has generated, the number of sources the crowd has evaluated, the proportion of users who have completed their analyses, and/or other information. This information may motivate users to improve their analyses and further foster the sense that they are part of a broader community. An example home screen that includes information about the crowds' aggregate contributions and accomplishments is illustrated in FIG. 7, described in more detail below.

In addition to facilitating stigmergic awareness of and access to others' work, the TRACE system may provide users a direct, asynchronous computer-mediated communication channel in the form of threaded forums. Asynchronicity may provide one or more of the following advantages for users of the TRACE system. First, users of the TRACE system may meaningfully contribute and evaluate topic-related information without the need to be virtually co-present. This mode of communication is often preferable in crowd systems environments because it affords self-paced engagement with the tool, thus allowing crowd workers to post and respond to each other's comments at their convenience. It also fosters a sense of community among the crowd participants. Second, the permanence of asynchronous text-based communication allows the TRACE system to preserve group discourse, and thus enable analysis of transcripts with minimal risk of decontextualization or lost meaning.

A threaded forum in the TRACE system may include a collection of forum posts on a particular topic. This arrangement may provide users with a clear sense of the different topics under discussion and an easy way to access and participate in a particular topic of discussion. For example, users may utilize one threaded forum to discuss tagging an information source to better tag actors, evidence, and events.

A threaded forum could also be created to discuss a contingent topic. For example, users could deliberate tags or hypotheses generated that may not be agreed upon by the others. The threaded forums provided by the TRACE system may be case-specific, which means discussion related to one case (or problem) would not interfere with discussions occurring among users working on a different case. This design may prevent or at least reduce possible confusion associated with the availability of unrelated case content and different topics permeating into multiple cases. Thus, it may result in threaded forums that are more focused within a specific case.

The TRACE system may be or include an application that supports reasoning and decision-making by combining structured analytic techniques and a stigmergic form of crowdsourcing. The TRACE system can be used to help intelligence analysts and other users improve the quality of their reasoning. The TRACE system may not only mitigate users' cognitive biases in reasoning but may also help produce higher quality analytic products that outline the reasoning and analysis processes in ways that others can readily comprehend. The TRACE system may be of interest beyond the IC and may enable a range of crowdsourcing efforts such as crowdsourcing-based product design, collective action for politics, and decision support system.

The stigmergic approach of the TRACE system may be particularly useful for crowdsourcing projects that place a high cognitive burden on participants. The stigmergic approach within the TRACE system may allow users to draw on other users' contributions and apply it to not only complement their efforts but also to contribute contrasting viewpoints to the work of others and see trends in crowd solutions, thus allowing the individual users to approach tasks more critically. The TRACE system differs from traditional STs in the IC that tend to be both consuming and cognitively burdensome for analysts.

Alternatively or additionally, embodiments described herein may contribute to the scholarship of crowdsourcing and information system research more broadly. Stigmergic coordination and communication among the crowds may potentially facilitate various crowdsourcing processes which in other stigmergic approaches often rely on a central actor to partition and later synthesize the crowd work into a coherent product. The stigmergic crowdsourcing approach such as that described herein for the TRACE system, in contrast, may allow individuals to develop their own analysis and with the benefit of having access to other crowd workers' effort.

The TRACE system may serve as a platform for other embodiments. The impact of the stigmergic approach to structured techniques on common cognitive biases that tend to emerge during intelligence analysis may be evaluated. The proposed crowd solution described herein in connection with the TRACE system may minimize common biases or may introduce new ones into the process. For example, as several prior studies have found, users of the TRACE system may be exposed to crowd work that is intended to anchor them on a particular piece of information or evaluation to determine if and how the anchoring effect may impact analysts in a stigmergic crowd setting.

A stigmergic approach may encourage users to pay close attention to their work as well as the work of others If users pay more attention to contributions, they may be inclined to engage in conversations about them, which may introduce the need to consider the best way to facilitate productive communication. Also, such a stigmergic approach may raise the question about where crowd communication should take place in order to promote productivity. To answer this question, dialogue/communications facilitated by a stand-alone asynchronous discussion forum interface may be compared with dialogue/communications facilitated by an asynchronous discussion forum interface embedded in specific analytical tasks such as the tagging tool. A direct form of communication embedded in the tagging tool may allow crowd workers to discuss specific tags, clarify points, or reconcile disagreements as they do their tagging work. Embodiments described herein may implement either or both of the foregoing asynchronous discussion forum interfaces or other asynchronous discussion forum interfaces.

More structured taxonomies may improve communications within the stigmergic environment of the TRACE system. For example, the addition of structured taxonomists (individuals who maintain and enhance the taxonomy language) may help to improve communication, understanding, and ultimately reasoning. Accordingly, embodiments described herein may receive input from structured taxonomists to maintain and enhance taxonomy language within the stigmergic environment.

To enhance learnability, the TRACE system may frame tasks (e.g., reasoning problems), inquiries, and tools users employ as puzzle- and mystery-solving activities. Tools of narrative, such as identifying key actors, events, and settings takes advantage of innate human strategies for making sense of the world, and have been found to enhance learning and problem-solving while minimizing unnecessary cognitive load. Narratives, defined as the representation of an event or series of events, allow humans to organize facts, sequences of events, and groups of central characters by transforming them into meaningful and coherent relationships. As a result, people can more easily engage critically with a situation, identify causes and effects, and find paths from problem to solution. Related to sense-making, narrative tools provide foundations with which complex or confusing information can be clearly examined and communicated because they allow us to frame events and sentences in larger structures.

Narrative structures have been employed in a range of technology projects, including early work on artificial intelligence that modeled goal achievement and ideologically-based understanding. The TRACE system may employ such tools, by, for example, asking users to identify, assess, and connect key people, historical and current events, and characteristics of the setting while they generate hypotheses, consider alternatives, establish analogies, or structure debates. In this way, ST processes may be implemented to draw on accessible concepts from narrative while remaining flexible enough to be applied to a range of problem types. For example, if the TRACE system is used to address a problem such as "Are domestic conflicts in region Y contributing to regional instability?" users might be prompted to identify key individuals (characters) and groups (society), features of the environment (world-building), and relevant events (plot). The TRACE system may then guide users in determining the relationships among these factors, causes and effects, ideological framing and perspectives, etc. While this prompting may not always be necessary for core analyst users, they may be highly beneficial in motivating and guiding less experienced analysts or more peripheral crowd participants.

The TRACE system may allow users to carry narrative tools from the analytical processes through to generating clear and coherent report products. Drawing on these tools may enhance the coherence and comprehensibility of the communication generated by users of the TRACE system. Focusing on the flow of information provided in the report via narrative approaches may enhance the overall quality of the communication produced for a range of policy-making audiences.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

FIG. 1 is a block diagram of an example operating environment 100 in which an example TRACE system may be implemented, arranged in accordance with at least one embodiment described herein. The operating environment 100 may include the TRACE system implemented on one or more servers 102 (hereinafter the TRACE server 102), one or more client devices 104, 106, 108, and one or more information sources 110. The TRACE server 102 and/or the client devices 104, 106, 108 may be configured to facilitate stigmergic coordination and communication of crowd workers (also referred to herein as users) and/or to support reasoning and decision making of crowd workers. In some embodiments, the TRACE system may dynamically construct analytical workflows that involve evaluation of the information sources 110 and assist or guide users in completing such workflows with or without stigmergic coordination and communication from crowd workers, all to support reasoning and decision making.

Although one TRACE server 102 and three client devices 104, 106, 108 are illustrated in FIG. 1, the operating environment 100 may more generally include one or more TRACE servers 102 and one or more client devices 104, 106, 108. In these and other embodiments, the operating environment 100 may include other servers and/or devices not illustrated in FIG. 1. Further, while the information sources 110 are depicted in FIG. 1 as being remotely located from the TRACE server 102 and the client devices 104, 106, 108, in some embodiments one or more of the information sources 110 may be stored locally at any of the TRACE server 102 and the client devices 104, 106, 108.

The operating environment 100 may additionally include a network 112. In general, the network 112 may include one or more wide area networks (WANs) and/or local area networks (LANs) that enable the TRACE server 102, the client devices 104, 106, 108, and the information sources 110 to communicate with each other. In some embodiments, the network 112 may include the Internet, including a global internetwork formed by logical and physical connections between multiple WANs and/or LANs. Alternately or additionally, the network 112 may include one or more cellular radio frequency (RF) networks and/or one or more wired and/or wireless networks such as 802.xx networks, Bluetooth access points, wireless access points, Internet Protocol (IP)-based networks, or other wired and/or wireless networks. The network 112 may also include servers that enable one type of network to interface with another type of network.

In at least one embodiment, the TRACE server 102 may host a web-based TRACE application 114 that facilitates stigmergic coordination and communication of crowd workers via the client devices 104, 106, 108 and/or supports reasoning and decision making of the crowd workers via the client devices 104, 106, 108. In other embodiments, the TRACE application 114 may include a non-web-based application but may generally be described herein as a web-based application for simplicity.

The TRACE server 102 may additionally include a processor 116 and a storage medium 118. The processor 116 may be of any type such as a central processing unit (CPU), a microprocessor (μP), a microcontroller (μC), a digital signal processor (DSP), or any combination thereof. The processor 116 may be configured to execute computer instructions that, when executed, cause the processor 116 to perform or control performance of one or more of the operations described herein with respect to the TRACE server 102 and/or the TRACE system.

The storage medium 118 may include volatile memory such as random access memory persistent or non-volatile storage such as read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer storage medium. The storage medium 118 may store computer instructions that may be executed by the processor 116 to perform or control performance of one or more of the operations described herein with respect to the TRACE server 102 and/or the TRACE system.

The storage medium 118 may additionally store one or more problem files 120. The problem files 120 may each include a reasoning problem 122, evaluation input 124, ST input 126, and reports 128. Alternatively or additionally, each problem file 120 may include or identify one or more of the information sources 110 that may be relevant to the corresponding reasoning problem 122.

The reasoning problem 122 in each of the problem files 120 may be received from an intelligence customer or other customer. Each customer may be any entity that has a reasoning problem to be analyzed and/or solved by users of the TRACE system.

The evaluation input 124 may be received from one or more users as they evaluate and consider one or more of the information sources 110 in their analysis of the reasoning problem 122. Evaluation input 124 from multiple users, e.g., crowd workers, may be aggregated in the problem file 120 and may be shared with other users that subsequently evaluate and consider the one or more information sources 110 to facilitate stigmergic coordination and communication among the users. Alternatively or additionally, evaluation input 124 from multiple users may be shared with each other in real time as the users evaluate and consider the one or more information sources 110 to facilitate stigmergic coordination and communication. The evaluation input 124 from a given user may include any input provided by the user, e.g., using evaluation tools described herein, while evaluating and analyzing a corresponding one of the information sources 110. For example, the evaluation input 124 may include highlights applied by the user to portions of the information sources 110, standard or custom tags applied by the user to portions of the information sources 110, evaluations by the user of relevance and credibility of the information sources 110 considered in analysis of the reasoning problem 122, comments of the user that, e.g., connect opinions of the user to portions of the information sources 110, or other suitable evaluation input.

The ST input 126 may be received from one or more users as they are guided through one or more STs in their analysis of the reasoning problem 122. ST input 126 from multiple users, e.g., crowd workers, may be aggregated in the problem file 120 and may be shared with other users that subsequently are guided through one or more STs to facilitate stigmergic coordination and communication among the users. Alternatively or additionally, ST input 126 from multiple users may be shared with each other in real time as the users are guided through one or more STs to facilitate stigmergic coordination and communication. The ST input 126 from a given user may include any input provided by the user while being guided through an ST by the TRACE system. Example STs that the TRACE system may guide users through may include one or more of generation of multiple hypotheses; a structured debate; consideration of pros and cons of a hypothesis supported by the one or more information sources 110; an Analysis of Competing Hypotheses (ACH); a Key Assumptions Check (KAC), or other suitable ST. Accordingly, the ST input 126 from any given user may include one or more of multiple hypotheses generated by the user; first arguments in support of a hypothesis supported by the one or more information sources 110 and second arguments against the hypothesis; input regarding pros and cons of a hypothesis considered by the user; one or more competing hypotheses generated by the user; input regarding evaluation and examination of assumptions underlying a judgment, or other suitable ST input 126.

The reports 128 may be received from one or more users in completion of their analysis of the reasoning problem 128. Reports 128 from multiple users, e.g., crowd workers, may be aggregated in the problem file 120 and may be shared with other users during their analysis of the reasoning problem 128 to facilitate stigmergic coordination and communication among the users. Alternatively or additionally, a single report 128 may be generated for the reasoning problem 122 by the crowd stigmergically coordinating and/or communicating with each other in real time or asynchronously and working on various portions of the report 128 individually or together.

Each of the client devices 104, 106, 108 may execute an application, such as a browser 130, configured to communicate through the network 112 with the TRACE server 102. The browser 130 may include an Internet browser or other suitable application to communicate through the network 112 with the TRACE server 102. The browser 130 or other application may provide an interface through which users may analyze reasoning problems according to embodiments described herein. Accordingly, the browser 130 may provide users with access to the information sources 110, tools of the TRACE system, and/or other features and functionality. Each of the client devices 104, 106, 108 may include a desktop computer, a laptop computer, a tablet computer, a mobile phone, a smartphone, or another suitable client device.

Each of the client devices 104, 106, 108 may additionally include a processor and a storage medium, such as a processor 132 and a storage medium 134 as illustrated for the client device 104 in FIG. 1. Each of the other client devices 106, 108 may be similarly configured. Similar to the processor 116 of the TRACE server 102, the processor 132 may be of any type such as a CPU, a µP, a µC, a DSP, or any combination thereof. The processor 132 may be configured to execute computer instructions that when executed, cause the processor 132 to perform or control performance of one or more of the operations described herein with respect to the client device 104 and/or the browser 130.

Similar to the storage medium 118 of the TRACE server 102, the storage medium 134 of the client device 104 may include volatile memory such as RAM, persistent or non-volatile storage such as ROM, EEPROM, CD-ROM or other optical disk storage, magnetic disk storage or other magnetic storage device, NAND flash memory or other solid state storage device, or other persistent or non-volatile computer storage medium. The storage medium 134 may store computer instructions that may be executed by the processor 132 to perform one or more of the operations described herein with respect to the client device 104 and/or the browser 130. The storage medium 134 may additionally store, at least temporarily, a problem file 120A and/or other content or data obtained from the TRACE server 102 and/or created locally on the client device 104. The problem file 120A may include some or all of the content of the problem file 120 on the TRACE server 102.

Embodiments described herein are not limited to using a browser to communicate with the TRACE server 102 to generate, customize, and/or interact with visualizations. For example, rather than or in addition to a browser, the client devices 104, 106, 108 may include a dedicated application. Alternatively or additionally, the TRACE application 114 may be installed and/or run as the dedicated application directly on the client device 104. Accordingly, embodiments described herein may be implemented with a browser, a dedicated application, or another suitable application on the client devices 104, 106, 108.

Figure 2:
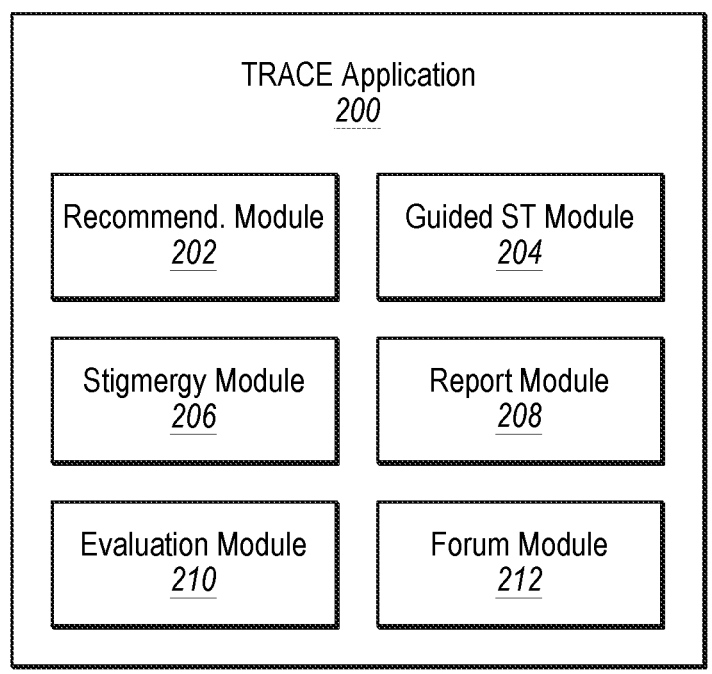
FIG. 2 illustrates an example TRACE application that may be implemented in FIG. 1.

FIG. 2 illustrates an example TRACE application 200 that may be implemented in FIG. 1, arranged in accordance with at least one embodiment described herein. The TRACE application 200 is an example of the TRACE application 114 of FIG. 1. As illustrated, the TRACE application 200 includes a recommendation module 202, a guided ST module 204, a stigmergy module 206, a report module 208, an evaluation modulate 210, and a forum module 212.

The recommendation module 202 may be configured to generate recommended analytic approaches to reasoning problems and provide the recommended analytic approaches to users. The recommendation module 202 may generate the recommended analytic approach for a given reasoning problem and user based on a reasoning problem type of the reasoning problem identified by the user. As described elsewhere, each recommended analytic approach may include one or more recommended STs and/or other tools.

Alternatively or additionally, the recommendation module 202 may be configured to nudge the user as described herein. Nudges are examples of just-in-time feedback mechanisms that may be implemented in embodiments of the TRACE systems described herein. Nudges may guide users through reasoning and reporting steps, and provide correction, alternative frames, and recommendations for next steps. The nudging feature may use information retrieval, machine learning (ML), and natural language processing (NLP) techniques to support reasoning tasks and the generation of analytic products (e.g., reports).

Nudging may be used in the TRACE system to train users of cognitive biases and related cognitive impediments to good decision-making. In some embodiments, the TRACE system may interject information into a GUI as part of a nudging system that serves as light training to help users understand such common errors in analytic reasoning.

The report module 208 may be configured to generate a report that includes the user's solution to the reasoning problem based on input from the user. For example, the report module 208 may provide a report template to the user, may receive input from the user for each of multiple sections of the report, and may generate the completed report.

Analytic judgments, e.g., solutions to reasoning problems, must not only be of high quality, but need to be communicated clearly. This requires describing the reasoning process, the key evidence that informed that reasoning process, key knowledge gaps or uncertainties, and the logical steps that support the assessment. Accordingly, at the end of the reasoning process, the TRACE system and/or the report module 208 may guide users in creating a template-based report product that provides highly readable and usable information on key judgments, hypotheses, alternative hypotheses, evidence, uncertainties, and/or overall reasoning. The generation of such analytic products may be closely integrated with crowdsourced ST process(es) and may take advantage of NLP and ML to provide feedback during the analytic product writing.

In some embodiments, it may be desirable for the analytic products produced by the users of the TRACE system that (1) they be well reasoned, and (2) they be well understood by consumer-surrogates. The report module 208 may include or implement procedures to assist users in avoiding potential reasoning problems.

The analytic product may start from, e.g., a report template configured for readability and legibility to ensure effective communication to a wide range of audiences. The report template may provide an information architecture that is easily navigated, accessible, and usable, and that includes executive summaries, tables and graphics, a navigation or indexing system, and clear section organization. The TRACE system may allow customization to ensure that the product fits the specific intelligence or other reasoning problem under consideration. The TRACE system may employ reminders, nudges, and automated checklists via an automated system to prompt users to fill out, refine, or improve the report product. The sections of the report template may correspond with key aspects of a successful reasoning and analytical process, which may include one or more of information evaluation, final judgment, justification, assumptions, alternative hypotheses considered, and gaps in information.

To compose and submit reports in an embodiment of the TRACE system, users may first answer a series of questions in output by the TRACE system. The questions may provide users with guidance and a roadmap for key elements necessary for a strong and successful analytic report. These questions may ask users to enter their final judgment, evaluate their accuracy, and the likelihood that their judgment is correct. These conclusion questions may also encourage users to justify their answer, identify and evaluate the sources, identify alternative answers and explain why they did not select them, assumptions that drove their reasoning, and identify gaps in the source information that would alter their judgment.

The TRACE system may automatically place users' answers to these questions into the corresponding sections of the user's final Report. The sections may include one or more of Summary & Conclusion, Justification, Resource Evaluation, Problematic Resources, Alternative Answers Considered, Assumptions, and Additional Information. When users are satisfied with their work, they may select a "Generate Report" button or equivalent button. A Report tab may then unlock and allow users to carefully edit a draft of the report using a word processor. When users have finished composing and editing their report draft, they may submit the final version by selecting a "Submit Report" button or equivalent button.

The evaluation module 210 may be configured to assist users in analyzing and evaluating one or more information sources, such as the information sources 110 of FIG. 1. The evaluation module 210 may provide users with corresponding evaluation tools to assist in the analysis and evaluation. Example evaluation tools may include one or more of a highlighting tool, a tagging tool, a commenting tool, and a credibility and relevance evaluation tool.

The guided ST module 204 may be configured to guide users through STs to support reasoning of the users in formulation of solutions to reasoning problems. Each ST may have one or more steps and the guided ST module 204 may guide each user through the step(s) of each ST and/or provide at least high-level guidance regarding how to complete each step.

The stigmergy module 206 may be configured to facilitate stigmergic coordination and cooperation among crowd workers. For example, the stigmergy module 206 may facilitate real-time sharing among crowd workers of evaluation input, ST input, reports, and/or other information created or provided by workers. Alternatively or additionally, the stigmergy module 206 may aggregate such content from crowd workers and share it asynchronously with other crowd workers.

The forum module 212 may be configured to facilitate threaded forums. The forum module 212 may be or include a messaging application that permits and stores asynchronous message threads and/or that facilitates organization and searching of message threads by topic.

Figure 3:
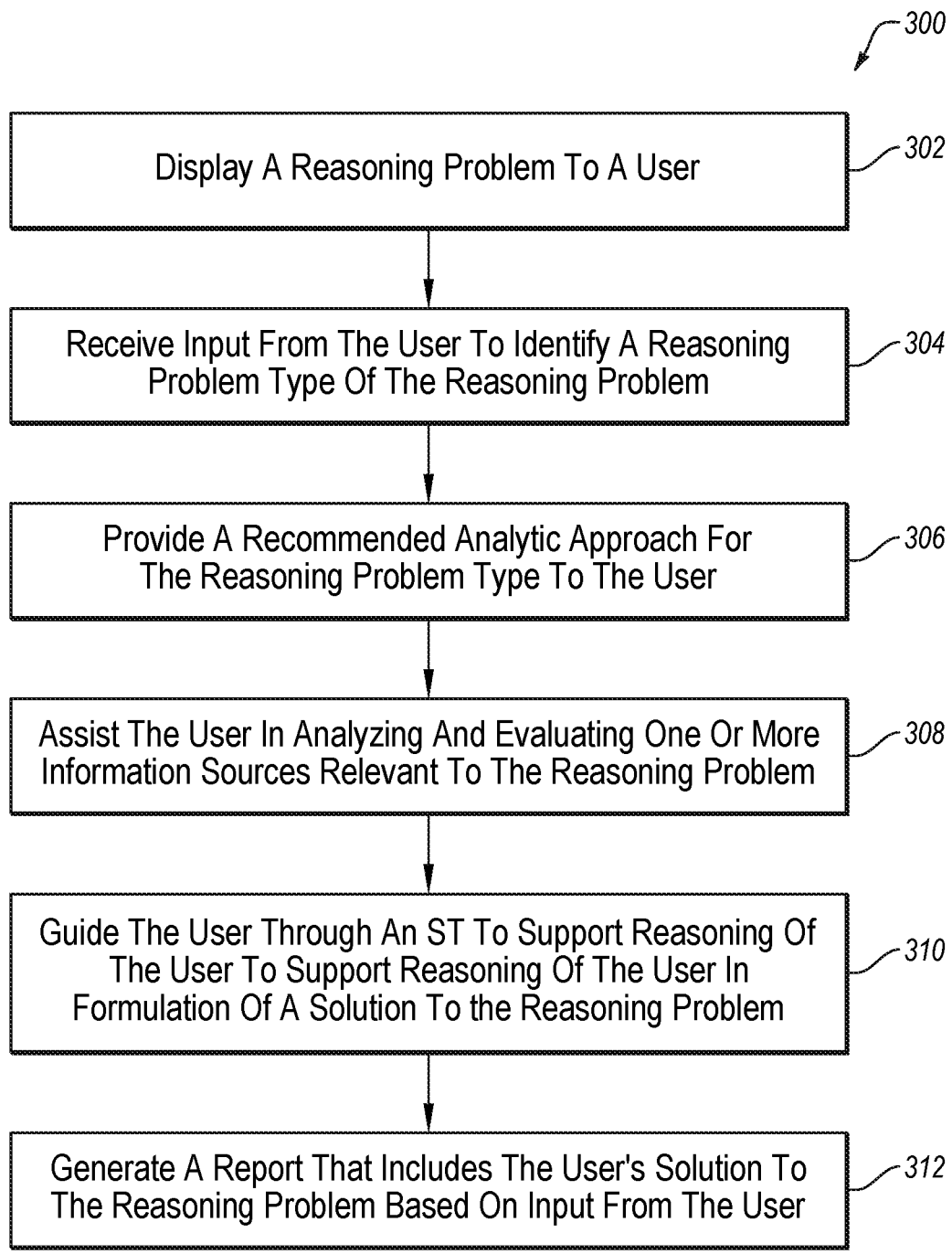
FIG. 3 is a flowchart of an example method to structure an analytical workflow that improves reasoning based on a problem context and demonstrated abilities of each individual user.

FIG. 3 is a flowchart of an example method 300 to structure an analytical workflow that improves reasoning based on a problem context and demonstrated abilities of each individual user, arranged in accordance with at least one embodiment described herein. The method 300 may be programmably performed or controlled by a processor in, e.g., a computer and/or server that executes a browser, TRACE application, and/or other application. In an example embodiment, the method 300 may be performed or controlled in whole or in part by the TRACE server 102 and/or the client device 104 of FIG. 1. The method 300 may include one or more of blocks 302, 304, 306, 308, 310, and/or 312.

At block 302, the method 300 may include displaying or otherwise providing a reasoning problem to a user. The user may be operating a client device, such as the client device 104 of FIG. 1 and the reasoning problem may be displayed or otherwise provided to the user via a display device or other output device of the client device 104. The reasoning problem may be received by the TRACE server 102 of FIG. 2 from an intelligence customer or other customer via a client device operated by the customer, such as the client device 106. Specifically, the reasoning problem may be received by the TRACE application 114 or 200 of FIG. 1 or 2 executing on the TRACE server 102. The reasoning problem may be provided by the TRACE server 102 to the client device 104 of the user to display or otherwise provide the reasoning problem to the user via an output device of the client device 104. Block 302 may be followed by block 304.

At block 304, the method 300 may include receiving input from the user to identify a reasoning problem type of the reasoning problem. For example, the user may input the reasoning problem type of the reasoning problem via an input device of the client device 104, which input may be sent to and received by the TRACE server 102. Block 304 may be followed by block 306.

At block 306, the method 300 may include providing a recommended analytic approach for the reasoning problem type to the user. In this and other embodiments, one or more analytic approaches may be optimized for or associated with certain reasoning problem types. Accordingly, the recommended analytic approach may be generated by, e.g., the recommendation module 202 of the TRACE application 200 based on the reasoning problem type identified by the user. Alternatively or additionally, the recommended analytic approach may be received by the TRACE server 102 from one or more crowd workers. Whether generated by the TRACE application 200 or received from the crowd, the TRACE server 102 may provide the recommended analytic approach to the user through the client device 104 Block 306 may be followed by block 308.

At block 308, the method 300 may include assisting the user in analyzing and evaluating one or more information sources relevant to the reasoning problem. For example, the evaluation module 210 of the TRACE application 200 may provide the user with various evaluation tools and/or the stigmergy module 206 of the TRACE application 200 may facilitate stigmergic coordination and/or communication to assist the user in analyzing and evaluating the one or more information sources.

The evaluation tools may include one or more of a highlighting tool, a tagging tool, a commenting tool, and a credibility and relevance evaluation tool. The highlighting tool may be configured to highlight a portion of the one or more information sources. The tagging tool may be configured to tag an item described in the one or more information sources as an actor, event, fact, or assumption and/or to tag an item described in the one or more information sources with a custom tag created by the user. The credibility and relevance evaluation tool may be configured to store an evaluation by the user of a relevance and credibility of the one or more information sources. The commenting tool may be configured to create and store a comment of the user that connects an opinion of the user to a portion of the one or more information sources. Block 308 may be followed by block 310.

At block 310, the method 300 may include guiding the user through an ST to support reasoning of the user in formulation of a solution to the reasoning problem. For example, the guided ST module 204 of the TRACE application 200 may guide the user through a recommended ST included in the recommended analytic approach and/or through one or more other STs. Alternatively or additionally, the stigmergy module 206 of the TRACE application 200 may facilitate stigmergic coordination and/or communication while the user is guided through the ST, which may allow the user to build on work previously completed by other users and/or to coordinate with other users in real time.

Guiding the user through the ST at block 310 may include guiding the user through generation of multiple hypotheses. Guiding the user through the ST at block 310 may include guiding the user through a structured debate in which the user is guided to generate first arguments in support of a hypothesis supported by the one or more information sources and to generate second arguments against the hypothesis. Guiding the user through the ST at block 310 may include guiding the user through consideration of pros and cons of a hypothesis supported by the one or more information sources. Guiding the user through the ST at block 310 may include guiding the user through an ACH ST in which the user is guided to generate and analyze multiple different hypotheses. Guiding the user through the ST at block 310 may include guiding the user through a KAC ST in which the user is guided to critically evaluate and examine assumptions underlying a judgment. Block 310 may be followed by block 312.

At block 312, the method 300 may include generating a report that includes the user's solution to the reasoning problem based on input from the user. For example, the report module 208 of the TRACE application 200 may provide a report template to the user, may receive input from the user for each of multiple sections of the report, and may generate the completed report. Alternatively or additionally, the stigmergy module 206 of the TRACE application 200 may facilitate stigmergic coordination and/or communication while the user is providing input for the report, which may allow the user to build on work previously completed by other users and/or to coordinate with other users in real time. Block 310 may be followed by block 312.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For instance, the method 200 may be combined with one or more other methods and processes described herein.

For example, the method 300 may further include influencing cognitive behaviors of the user to reduce a number of trivial decisions and/or logical pitfalls of the user and/or to mitigate common cognitive errors in rational problem analysis by the user. The foregoing may be accomplished by at least one of: facilitating stigmergic communication among multiple users (e.g., the crowd workers) that include the user; nudging the user to at least one of: consider additional information, complete a second ST, or provide feedback that relates to the user's reasoning; and providing the user with one or more annotation tools for the analysis and evaluation of the one or more information sources.

In at least one embodiment, facilitating stigmergic communication includes: aggregating prior evaluation input of the one or more information sources from multiple users, e.g., other crowd workers; and displaying to the user the prior evaluation input in context with the one or more information sources such that the user's reasoning builds on the prior evaluation input.

In at least one embodiment facilitating stigmergic communication includes: aggregating prior ST input received from multiple users guided previously through the ST for the same reasoning problem; and displaying to the user the prior ST input from the users such that the user's completion of the ST builds on the prior ST input.

Alternatively or additionally, the method 300 may further include displaying a report checklist to the user that identifies at least one of features of the user's reasoning to be made explicit for an external audience to understand the user's solution to the reasoning problem; justifications for the user's solution; alternative hypotheses considered by the user; and assumptions made by the user that could change the user's solution if the assumptions are incorrect.

Alternatively or additionally, the method 300 may further include displaying a given one of the one or more information sources in a first portion of a user interface, e.g., on a display device of the client device 104; and simultaneously displaying at least some evaluation input of the user in a second portion of the same user interface. An example is illustrated in FIG. 6. Each evaluation input may be associated with a corresponding portion of the one or more information sources. The method 300 may further include aggregating evaluation input of the user in the second portion of the user interface; and in response to selection of a given annotation from the second portion of the user interface, automatically displaying the corresponding portion of the one or more information sources in the first portion of the user interface.

In at least one embodiment, providing the recommended analytic approach at block 306 may include providing a recommended ST to the user. Alternatively or additionally, guiding the user through the ST at block 310 may include guiding the user through the recommended ST included in the recommended analytic approach.

Generating the report at block 312 may include or be performed after providing a report template to the user that includes multiple sections and receiving input from the user in each of the sections. In an example, the report template may include a final judgment section, a justification section, a discussion section, a numerical evaluation section, and/or other sections, accordingly, receiving input from the user in each of the sections may include receiving at least one of a final judgment, conclusion, or recommendation of the user, a justification of the final judgment, conclusion, or recommendation of the user; a discussion of alternative hypotheses; and a final probability assessment of the final judgment.

Figure 4:
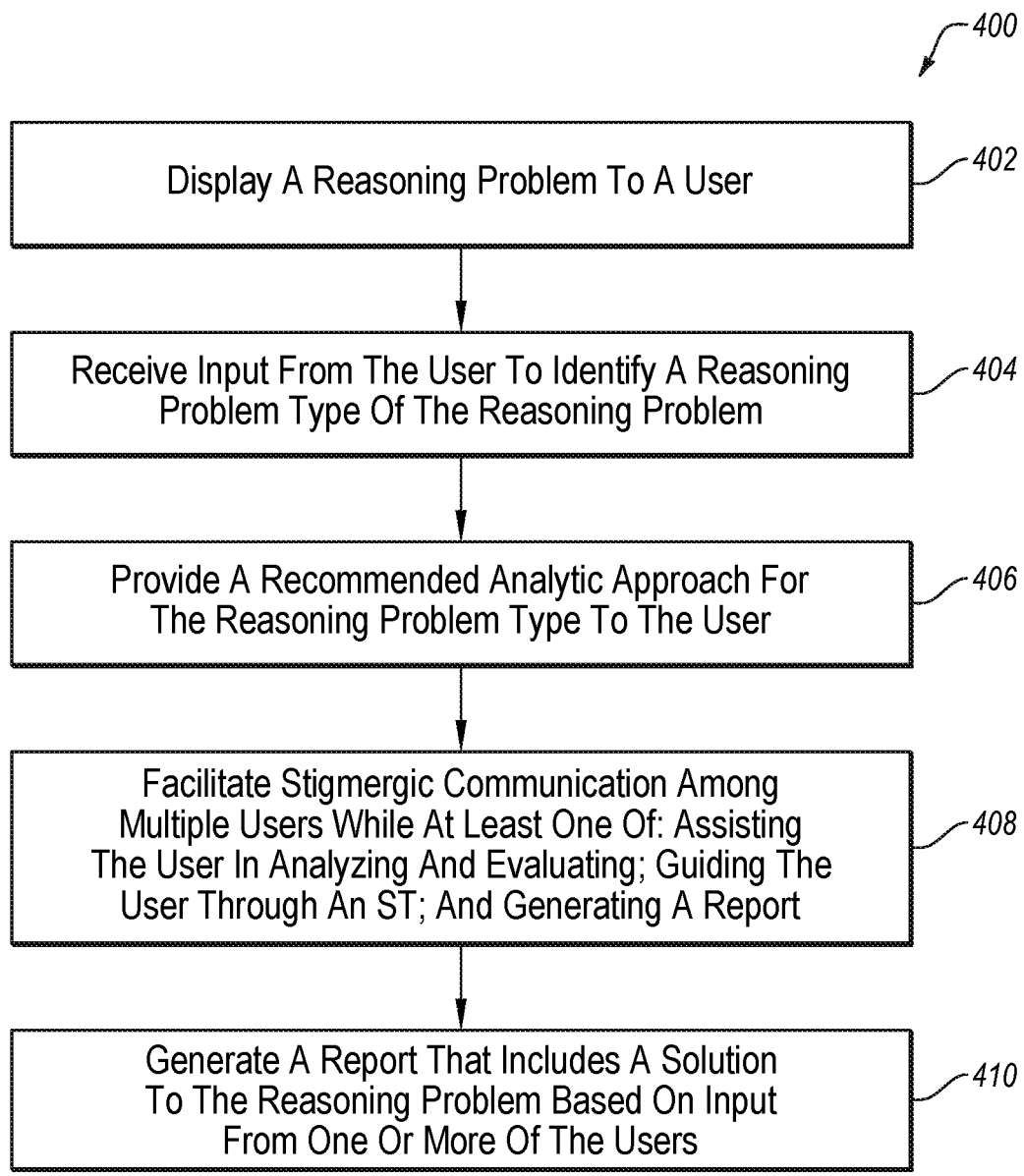
FIG. 4 is a flowchart of another example method to structure an analytical workflow that improves reasoning based on a problem context and demonstrated abilities of each individual user.

FIG. 4 is a flowchart of another example method 400 to structure an analytical workflow that improves reasoning based on a problem context and demonstrated abilities of each individual user, arranged in accordance with at least one embodiment described herein. The method 400 may be programmably performed or controlled by a processor in, e.g., a computer and/or server that executes a browser, TRACE application, and/or other application. In an example embodiment, the method 400 may be performed or controlled in whole or in part by the TRACE server 102 and/or the client device 104 of FIG. 1. The method 400 may include one or more of blocks 402, 404, 406, 408, and/or 410.

At block 402, the method 400 may include displaying or otherwise providing a reasoning problem to a user. Block 402 may be the same as or similar to block 302 in FIG. 3. Block 402 may be followed by block 404.

At block 404, the method 400 may include receiving input from the user to identify a reasoning problem type of the reasoning problem. Block 404 may be the same as or similar to block 304 in FIG. 3. Block 404 may be followed by block 406.

At block 406, the method 400 may include providing a recommended analytic approach for the reasoning problem type to the user. Block 406 may be the same as or similar to block 306 in FIG. 3. Block 406 may be followed by block 408.

At block 408, the method 400 may include facilitating stigmergic coordination and/or communication among multiple users, e.g., crowd workers, that include the user. The stigmergic coordination and/or communication may be facilitated while at least one of: assisting the user in analyzing and evaluating one or more information sources relevant to the reasoning problem; guiding the user through an ST to support reasoning of the user in formulation of a solution to the reasoning problem; and generating a report that includes a solution to the reasoning problem based on input from one or more of the users.

In at least one embodiment, facilitating the stigmergic coordination and/or communication at block 408 may include aggregating prior evaluation input of the one or more information sources from the users and displaying to the user the prior evaluation input from the users in context with the one or more information sources such that the user's reasoning builds on the prior evaluation input. Alternatively or additionally, facilitating the stigmergic coordination and/or communication at block 408 may include aggregating prior ST input received from the users guided previously through the ST for the same reasoning problem and displaying to the user the prior ST input from the users such that the user's completion of the ST builds on the prior ST input.

In at least one embodiment, facilitating the stigmergic coordination and/or communication at block 408 may include aggregating evaluation input of the one or more information sources from the users in real time and displaying the aggregated evaluation input to each of the users in real time. Alternatively or additionally, facilitating the stigmergic coordination and/or communication at block 408 may include aggregating ST input from the users in real time while the users are guided through the ST and displaying the aggregated ST input to each of the users in real time.

When implemented, guiding the user through the ST at block 408 may include one or more of: guiding the user through generation of multiple hypotheses; guiding the user through a structured debate in which the user is guided to generate first arguments in support of a hypothesis supported by the one or more information sources and to generate second arguments against the hypothesis; guiding the user through consideration of pros and cons of a hypothesis supported by the one or more information sources; guiding the user through an ACH ST in which the user is guided to generate and analyze multiple different hypotheses; and guiding the user through a KAC ST in which the user is guided to critically evaluate and examine assumptions underlying a judgment. Block 408 may be followed by block 410.

At block 410, the method 400 may include generating a report that includes a solution to the reasoning problem based on input from one or more of the users. Block 410 may be the same as or similar to block 306 in FIG. 3. Alternatively or additionally, generating the report at block 410 may include generating the report that includes the user's solution to the reasoning problem based on input from the user or generating a single report for the users that includes a crowd-based solution to the reasoning problem based on input from one or more of the users.

In at least one embodiment, the method 400 may further include nudging the user to at least one of: consider additional information, complete a second ST, or provide feedback that relates to the user's reasoning.

In at least one embodiment, providing the recommended analytic approach at block 406 may include providing a recommended ST to the user. Alternatively or additionally, guiding the user through the ST at block 408, when implemented, may include guiding the user through the recommended ST included in the recommended analytic approach.

Various example GUIs that may be implemented with one or more embodiments of the TRACE system described herein will now be described One or more of the GUIs may be served by, e.g., the TRACE server 102 of FIG. 1 to a corresponding one of the client devices 104, 106, 108 to be output to a user.

Figure 5:
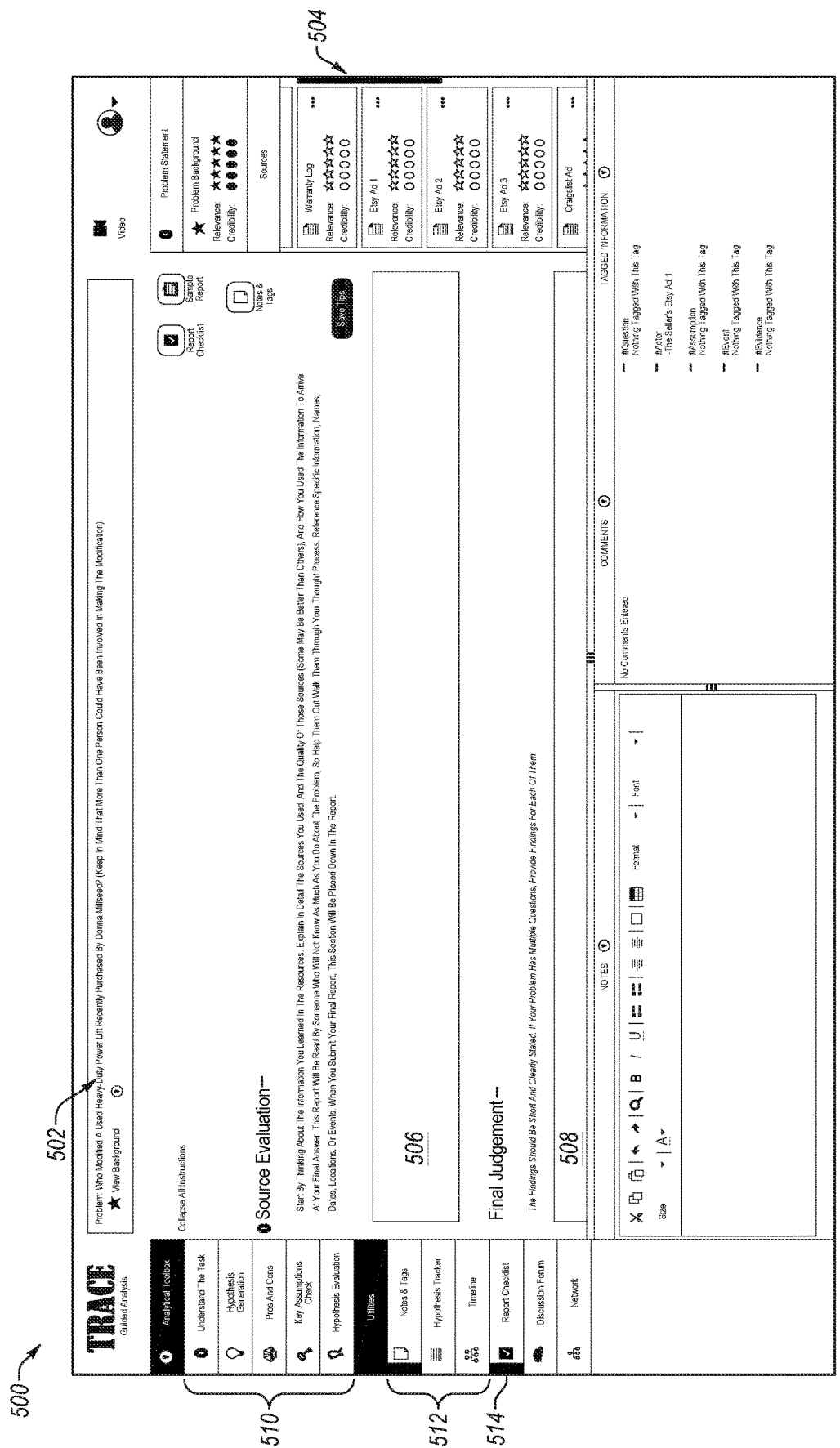
FIG. 5 illustrates a first example TRACE system graphical user interface (GUI)

FIG. 5 illustrates a first example TRACE system GUI 500, arranged in accordance with at least one embodiment described herein. As illustrated, the GUI 500 may include sections 502, 504, 506, 508.

The section 502 may include a reasoning problem and/or various background information associated with the reasoning problem.

The section 504 lists various information sources and may provide links to each. For example, the user may select a corresponding link to display a corresponding information source within the GUI 500. The section 504 may provide a quick view of all of the information sources users need to access to solve the reasoning problem. When a user clicks on an information source's link, the corresponding information source may open in a new browser tab, to allow users to open multiple information sources at once and quickly switch between the different information sources and other aspects of the TRACE GUI 500. To indicate which information sources the user has accessed, the links for information sources that the user has viewed may change color from a bold blue to a lighter purple or other color change. Additionally, the section 504 may include a counter above the information source links that may indicate how many information sources the user has accessed and the total number of information sources for that particular reasoning problem.

The section 504 may also include a relevance score and credibility score for each of the information sources listed in the section 504. In the illustrated example, each relevance score and credibility score for each information source may be configured from a selectable scale of 1 to 5 stars or circles (with 1 being less credible/relevant and 5 being more credible/relevant) where the user can evaluate the relevance and credibility of each information source and select the corresponding number of stars or circles to assign a desired score. Other ranges or interfaces may be implemented for the user to evaluate the relevance and credibility of each information source. For instance, one input field may be provided for the relevance and another input field may be provided for the credibility of each information source where the user enters an actual number or letter selected from a permissible range (e.g., 1-10, A-D, etc.) to score the relevance and credibility. Alternatively, some or all of the section 504 may be omitted.

The section 506 includes an input field where the user may input other comments or information related to the user's evaluation of the information sources. Optionally, instructions associated with the section 506 may be provided near or in the input field of the section 506, such as above the input field, such as above the input field as illustrated in FIG. 5.

The section 508 includes an input field where the user may input their final judgment with respect to the reasoning problem specified in the section 502. The final judgment may also be referred to as a solution to the reasoning problem. Optionally, instructions associated with the section 508 may be provided near or in the input field of the section 508, such as above the input field as illustrated in FIG. 5.

The GUI 500 may further include various buttons to the left of the sections 502, 506, 508 or elsewhere in the GUI, including buttons 510 to access one or more guided STs, buttons 512 to access one or more evaluation tools or other "Utilities", a Report Checklist button to open a report checklist, or other buttons or tools.

FIG. 6 illustrates a second example TRACE system GUI 600, arranged in accordance with at least one embodiment described herein. As illustrated, the GUI 600 may include sections 602 and 604.

The section 602 includes a viewing pane to view an information source selected from a drop down menu above the viewing pane. The user may navigate through the information source by scrolling up or down or side to side or in any other suitable manner. Various evaluation tools 606 may be included in the GUI 600, including, from top to bottom, a highlighting tool, a tagging tool, and a commenting tool.

The section 604 may include comments, tagging, or other evaluation input from the user or other crowd workers. In the illustrated embodiment, various tags are shown, including two fact tags (each labeled "#Fact") and one actor tag (labeled "#Actor"). Each tag is also shown with an associated comment (shown as a nonce word "nonono . . . " for illustrative purposes). In other embodiments, tags may be separate from comments.

As illustrated, buttons "My work" and "Crowd view" or other buttons in the section 604 may be provided for the user to toggle between the user's own tags, comments, or other evaluation input and that of other users in the crowd. Alternatively, evaluation of the user and other users may be intermixed.

Alternatively or additionally, each tag and/or comment may include one or more buttons for the user to vote or otherwise opine on the relevance, importance, or other aspect of evaluation input provided by other users. In general, this may serve to curate crowd generated tags, comments, or other crowd-generated evaluation input. Another evaluation tool 608 may be included in the GUI.

As illustrated, the GUI 600 may further include a relevance rating and credibility rating, e.g., at the top or other location of the section 604, from which the user may rate the relevance and credibility of the information source in the section 602.

FIG. 7 illustrates a third example TRACE system GUI 700 in the form of a home screen, arranged in accordance with at least one embodiment described herein. As illustrated, the GUI 700 may include sections 702, 704, and 706.

The section 702 may include a personal section of the user. The section 702 may include one or more of an image or avatar of the user, a username of the user, and various self-awareness information. The self-awareness information may include one or more of a summary of the user's activity within the TRACE system (e.g., number of cases (or reasoning problems) completed), number of forum contributions, number of positive votes or likes on the user's tags or other evaluation input, and/or a summary of the user's reputation with respect to evaluation input provided by the user and voted on by other users. Alternatively or additionally, the section 702 may include feedback and/nudges for the user.

The section 704 may include a community awareness section for an entire community or crowd working on a reasoning problem or set of reasoning problems. The section 704 may include recent forum activity from other users with respect to forum threads in which the user is involved or to which the user has posted. The section 704 may include other information, buttons, or functionality related to community awareness.

The section 706 may include a project awareness section for the reasoning problem or set of reasoning problems the crowd or community to which the user belongs is working on. For each reasoning problem or report for the reasoning problem (see "Report 1", "Report 2", and "Report 3" in FIG. 7), the section 706 may include an indication of the user's individual progress as well as the crowd's collective progress on the corresponding reasoning problem.

Figure 8:
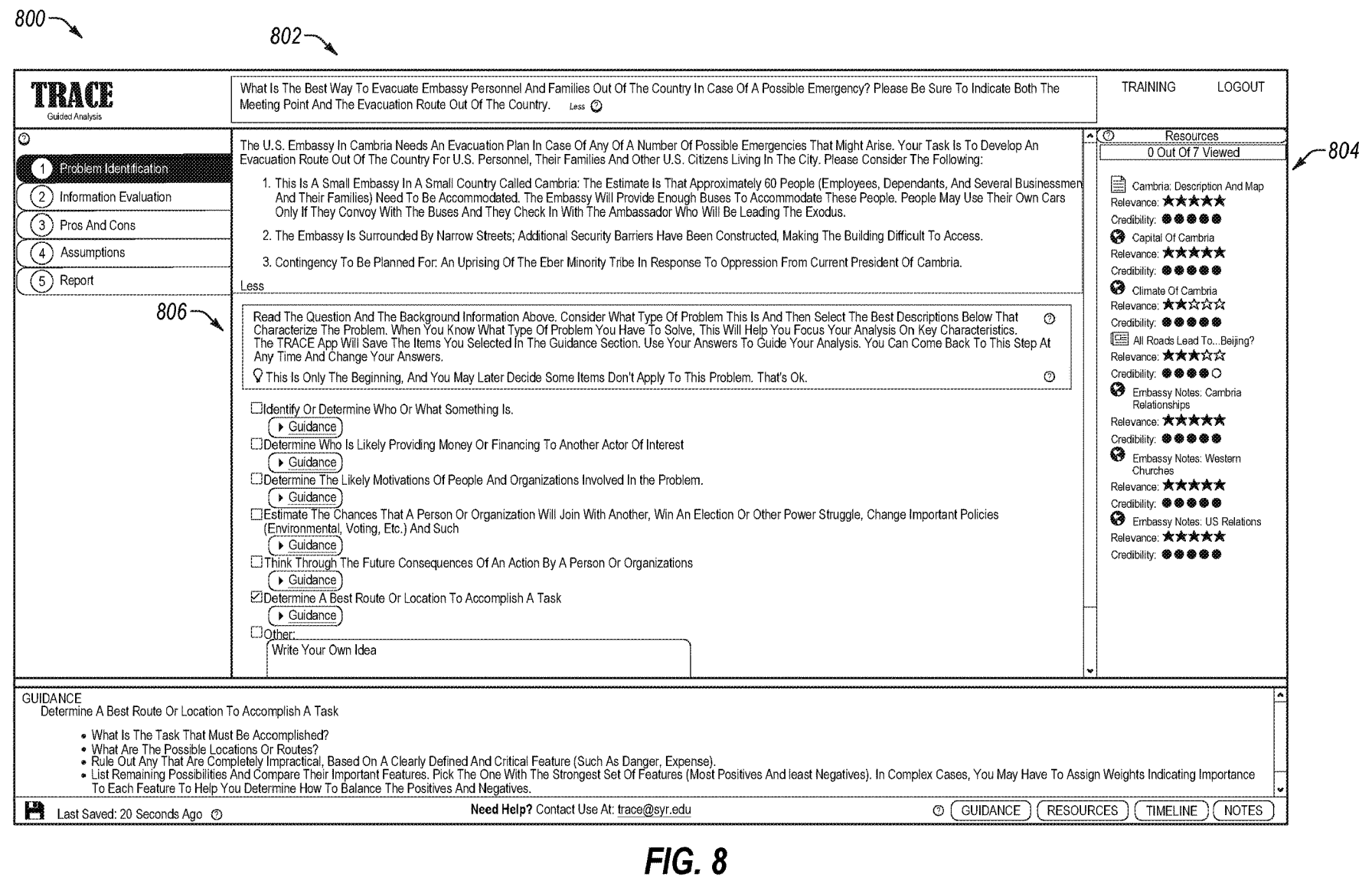

FIG. 8 illustrates a fourth example TRACE system GUI 800, arranged in accordance with at least one embodiment described herein. As illustrated, the GUI 800 may include sections 802, 804, and 806.

The section 802 may be the same as or similar to the section 502 of FIG. 5 and includes both a reasoning problem at the top and background or additional information below the reasoning problem.

The section 804 may be the same as or similar to the section 504 of FIG. 5 and includes both a reasoning problem at the top and background or additional information below the reasoning problem.

The section 806 may include a section for the user to provide input identifying a reasoning problem type of the reasoning problem included in the section 802. The section 806 lists various selectable reasoning problem types with expandable "Guidance" that may explain which reasoning problems may qualify as the corresponding reasoning problem type.

Figure 9:
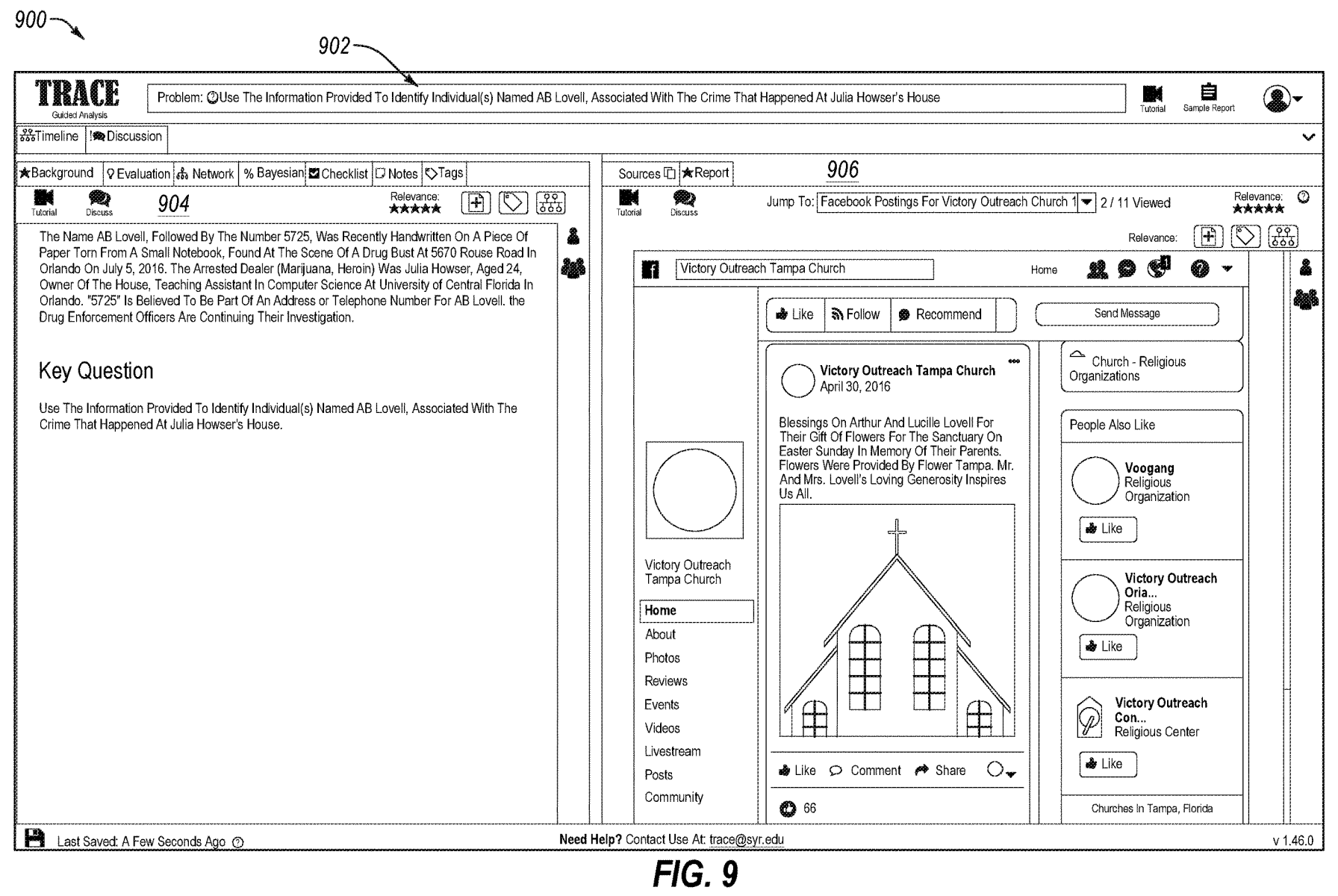

FIG. 9 illustrates a fifth example TRACE system GUI 900, arranged in accordance with at least one embodiment described herein. As illustrated, the GUI 900 may include sections 902, 904, and 906.

The section 902 includes a reasoning problem.

The section 904 may include background or additional information of the reasoning problem in the section 902, or other information.

The section 906 may include or display information sources or other information.

In some embodiments, one or both of the sections 904, 906 may be tabbed to allow the user to easily access various different tools or information within the section 904, 906.

For example, selection of a "Background" tab in the section 904 may allow the user to view the background or additional information in the section 904 as illustrated. Selection of an "Evaluation" tab may allow the user to access and be guided through one or more STs in the section 904. Selection of a "Network" tab may allow the user to create a network group with appropriately formatted data in the section 904. Selection of a "Bayesian" tab may allow the user to create a Bayesian model to guide statistical inference in the section 904. Selection of a "Checklist" tab may allow the user to view a report checklist in the section 904, e.g., to ensure the user as completed all relevant evaluation and analysis tasks and/or included all relevant sections in the user's final report. Selection of a "Notes" tab may allow the user to take notes in the section 904. Selection of a "Tags" tab may allow the user to tag items of information of the information source displayed in the section 906.

Selection of a "Sources" tab in the section 906 may allow the user to review information sources in the section 906, as illustrated in FIG. 9. Selection of a "Report" tab may allow the user to access a report template to prepare a report in the section 906.

Viewing different information simultaneously in different sections 902, 904, 906 as illustrated in this and other FIGs. herein may reduce a cognitive load of the user while working on reasoning problems.

Figure 10:
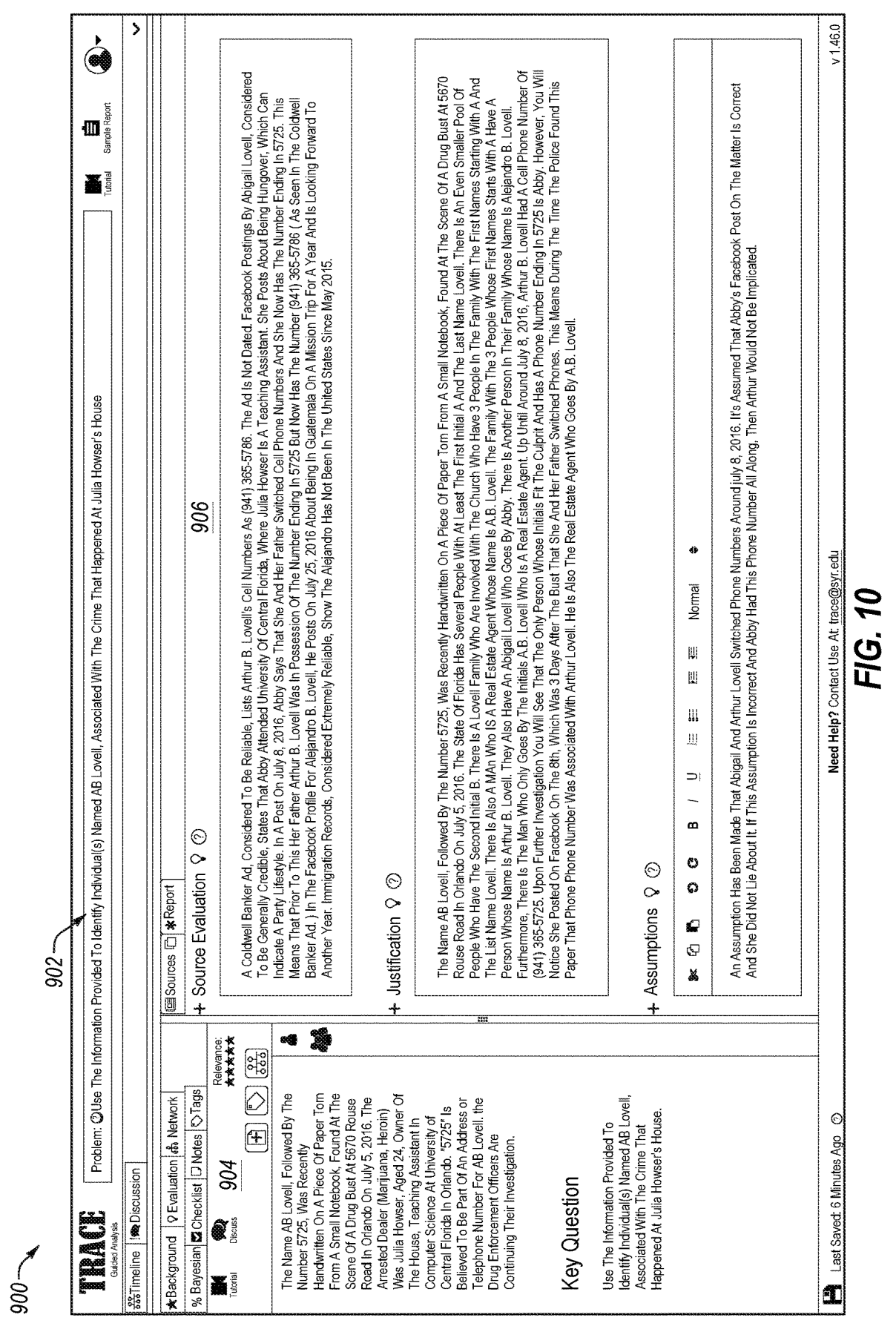

FIG. 10 illustrates the GUI 900 of FIG. 9 after selection of the "Reports" tab in the section 906, arranged in accordance with at least one embodiment described herein. As illustrated, the section 906 displays the user's final report broken down into various sections, specifically a Source Evaluation section, a Justification section, and an Assumptions section for each of which the user has provided various input. More generally, reports generated based on user input may include one or more of these or other sections.

Figure 11:
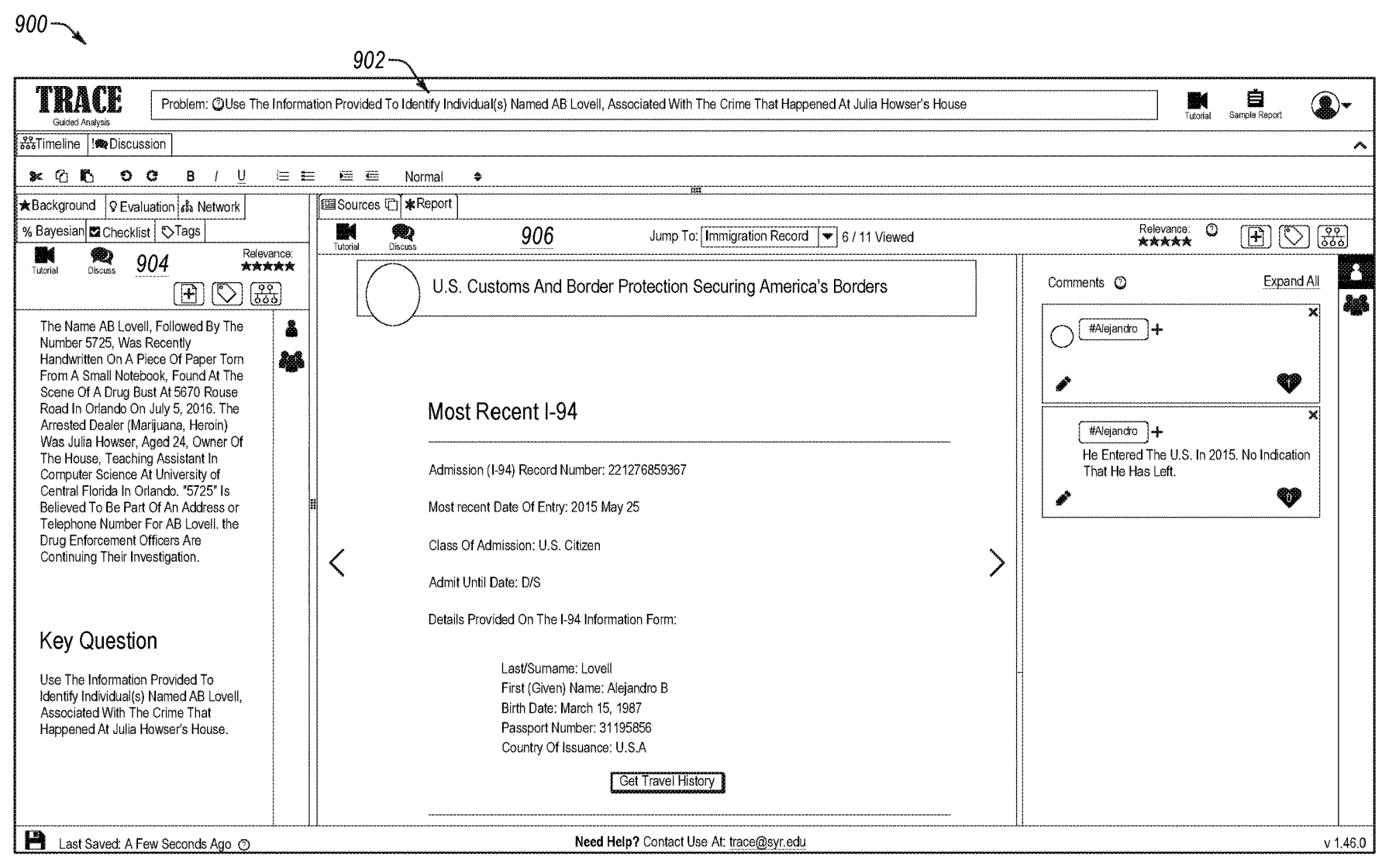

FIG. 11 illustrates the GUI 900 of FIG. 9 after loading a different information source than in FIG. 9 in the section 906, arranged in accordance with at least one embodiment described herein. As illustrated in FIG. 11, the section 906 additionally includes various evaluation input in the form of comments added by the user to the information source.

FIG. 12 illustrates the GUI 900 of FIG. 9 after both selection of the "Evaluation" tab in the section 904 and loading a different information source than in FIG. 9 in the section 906, arranged in accordance with at least one embodiment described herein. As illustrated in FIG. 12, selection of the "Evaluation" tab guides the user through one or more STs in the section 904.

Figure 13:
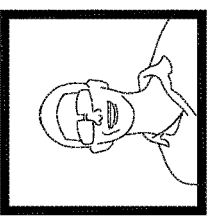
FIG. 13 illustrates the GUI of FIG. 9 after selection of the "Evaluation" tab, completion of a guided ST shown in FIG. 12, and loading a different information source than in FIG. 9.

FIG. 13 illustrates the GUI 900 of FIG. 9 after selection of the "Evaluation" tab in the section 904, completion of the guided ST shown in FIG. 12, and loading a different information source than in FIG. 9 in the section 906, arranged in accordance with at least one embodiment described herein. While FIG. 12 illustrates "Generating Possible Hypotheses" guided ST with an "Evaluate Hypotheses" button in the section 904, FIG. 13 illustrates an "Evaluate each hypothesis" guided ST that may be shown in the section 904 in response to selection of the "Evaluate Hypotheses" button in FIG. 12.

As illustrated in FIG. 13, the "Evaluate each hypothesis" guided ST may provide the user with a matrix to organize all information that supports and disconfirms each hypothesis, evaluate the significance of this information, identify any key assumptions that correspond with that information, and evaluate the likelihood that those assumptions may be incorrect.

The GUI 900 of FIGS. 9-13 and other FIGs. herein may optionally include one or more of a "Timeline" tab, a "Discussion" tab, and a "Notes" tab between the sections 902 and 904 and/or at other location(s).

Figure 14:
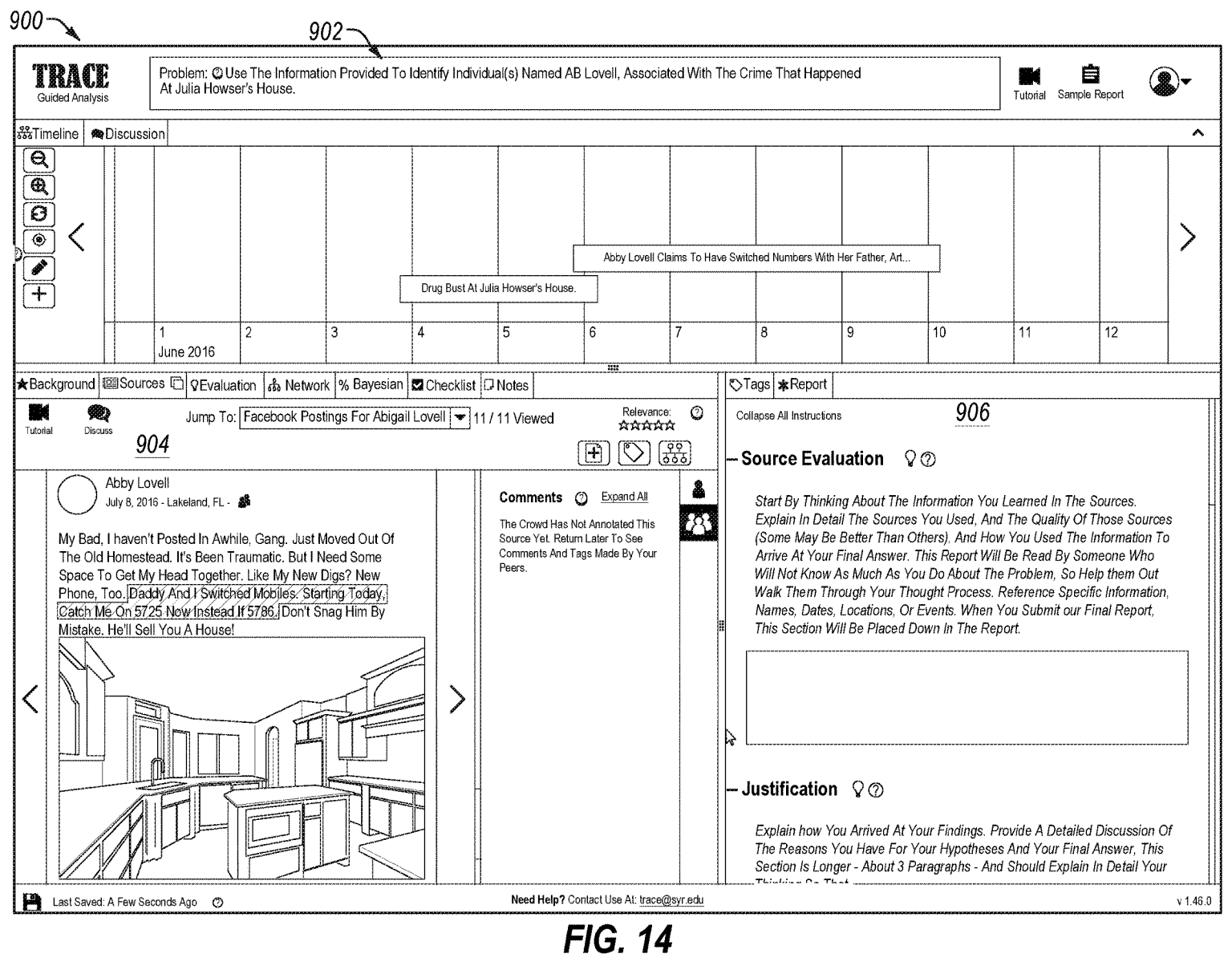

FIG. 14 illustrates the GUI 900 of FIG. 9 after selection of the "Timeline" tab, arranged in accordance with at least one embodiment described herein The TRACE system may provide a timeline tool in the form of the "Timeline" tab or other suitable form that provides users with an easy method to store, retrieve, and organize date-based evidence and events.

Figure 15:
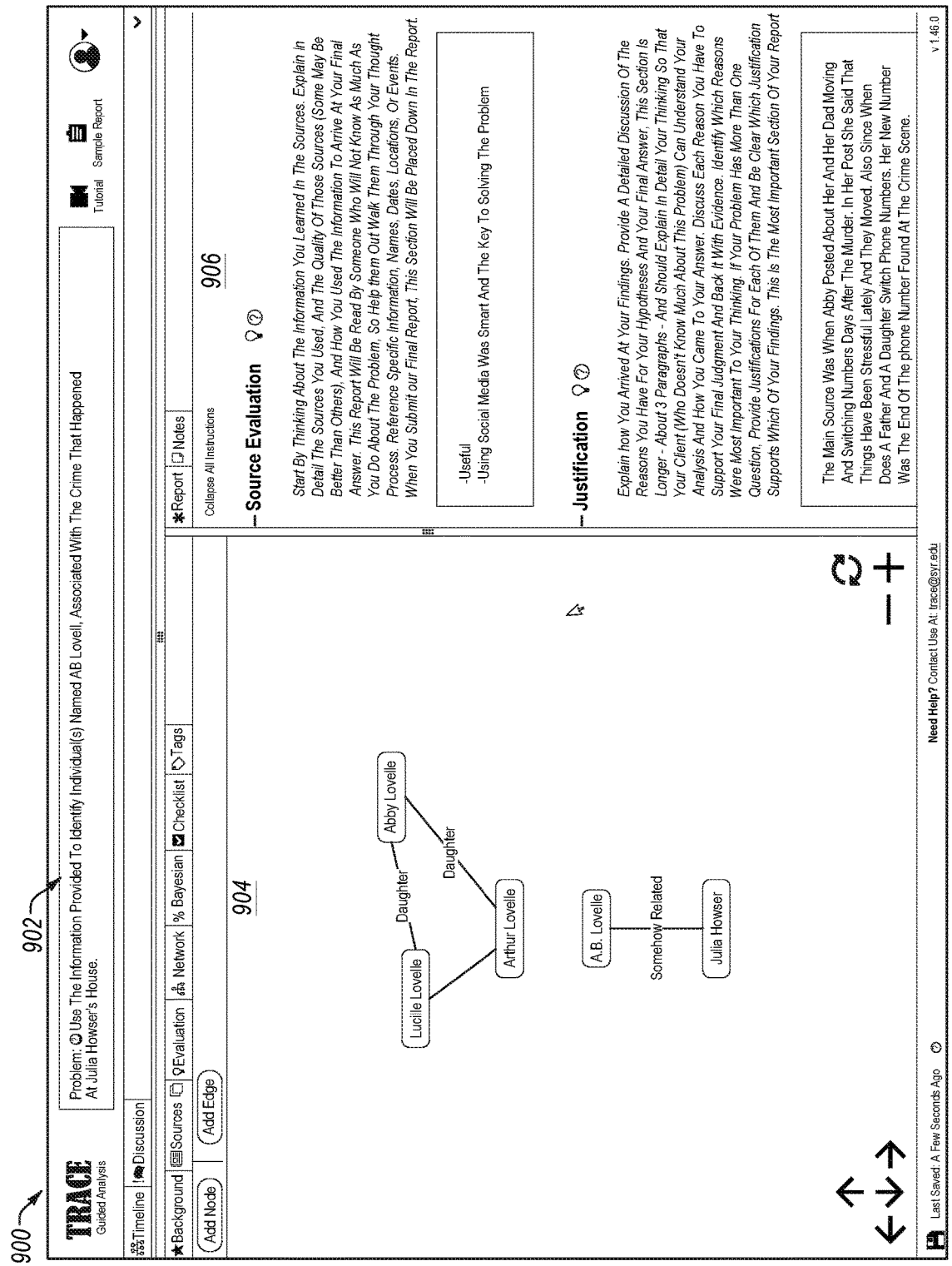
FIG. 15 illustrates the GUI of FIG. 9 after both selection of a "Network" tab and selection of the "Report" tab of FIG. 9.

FIG. 15 illustrates the GUT 900 of FIG 9 after both selection of the "Network" tab in the section 904 and selection of the "Report" tab in the section 906, arranged in accordance with at least one embodiment described herein. The TRACE system may provide a network tool in the form of the "Network" tab or other suitable form that may help users visually map relationships between actors identified (and optionally tagged) in their evaluation and analysis of the information sources.

Figure 16:
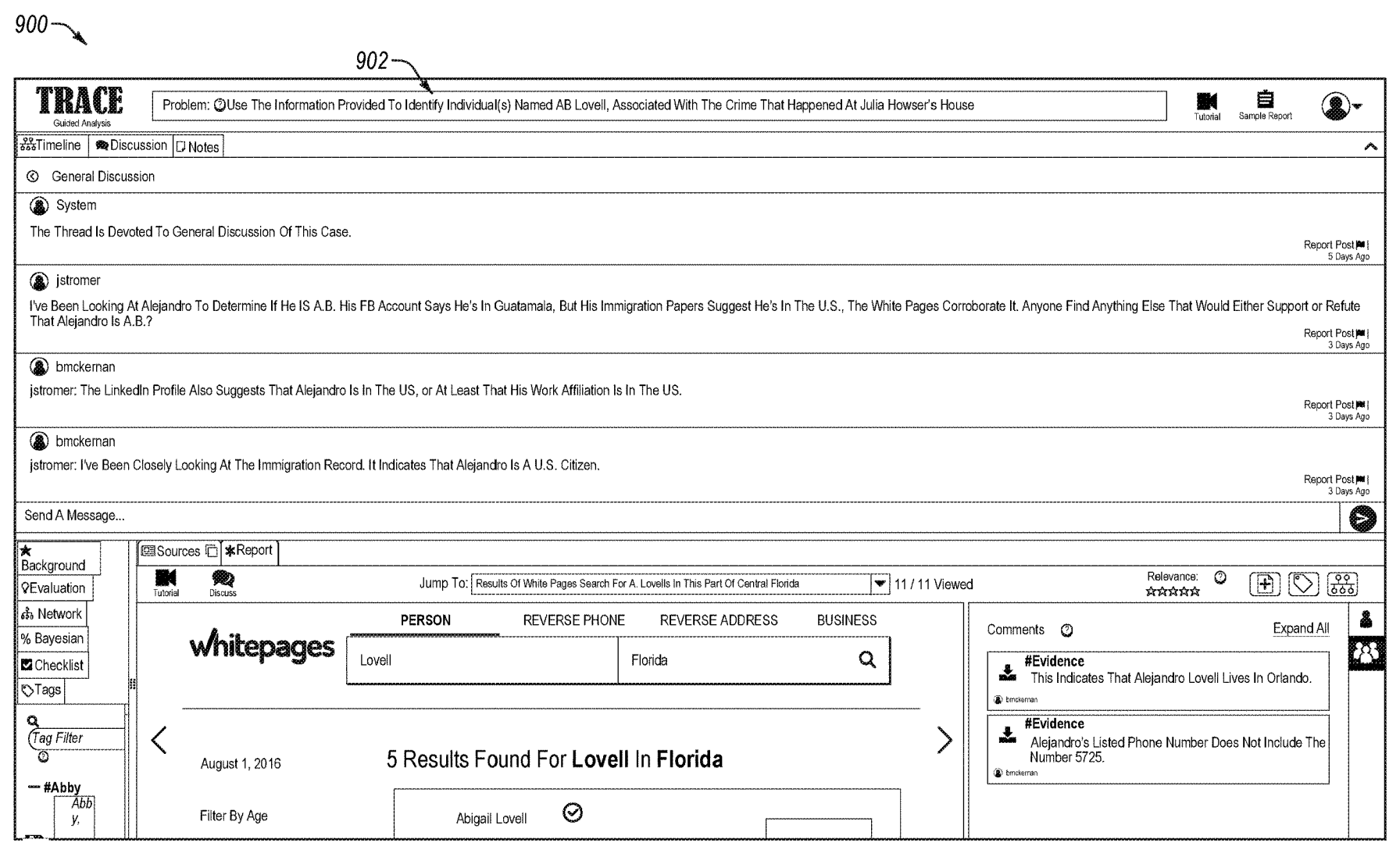

FIG. 16 illustrates the GUI 900 of FIG. 9 after selection of the "Discussion" tab, arranged in accordance with at least one embodiment described herein. The TRACE system may provide tools to help users working in teams or groups, optionally in the form of the "Discussion" tab or other suitable form. Selection of the "Discussion" tab may provide the user with access to one or more threaded forums.

Figure 17:
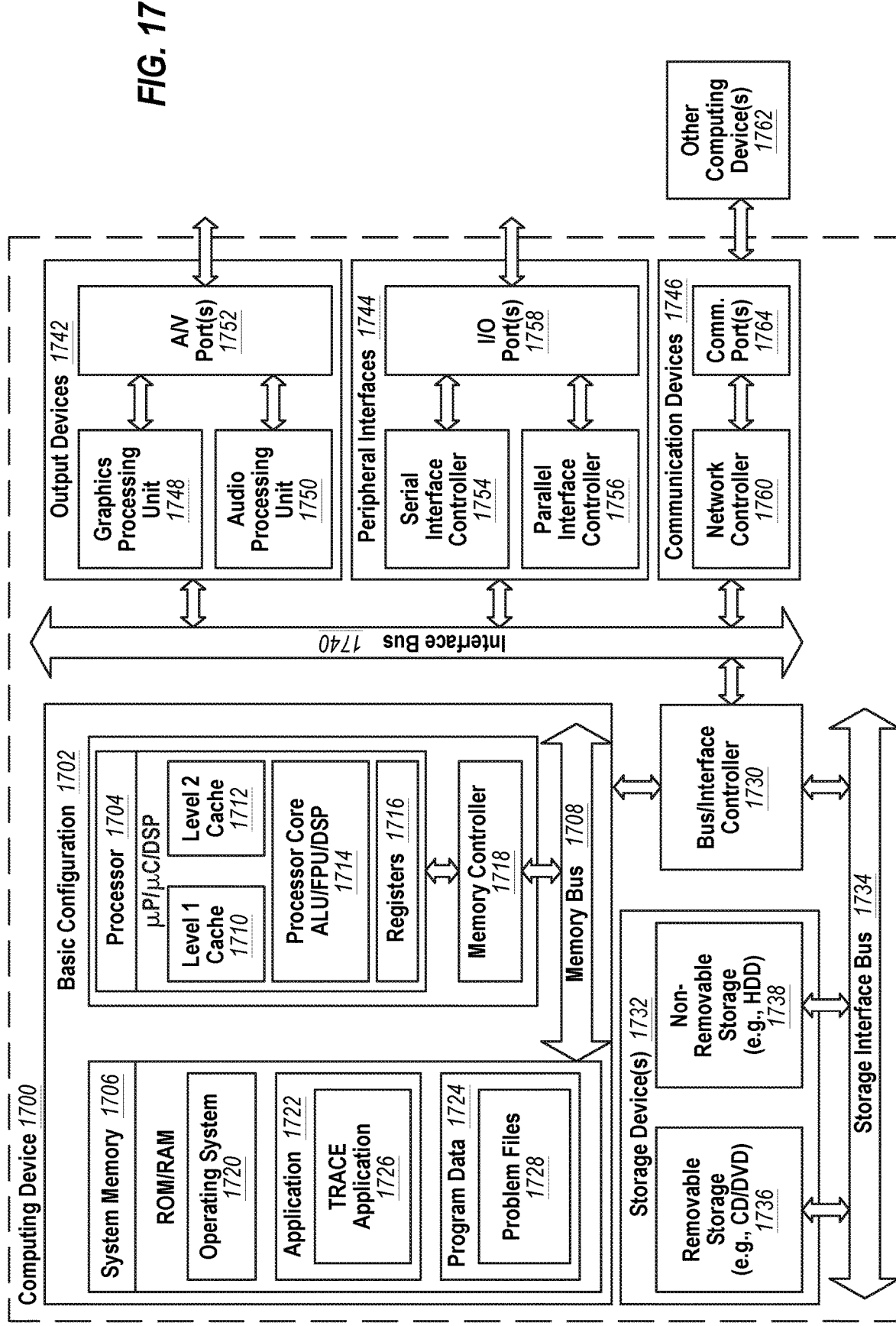
FIG. 17 is a block diagram illustrating an example computing device that is arranged to structure an analytical workflow, all arranged in accordance with at least one embodiment described herein.

One or more of the GUIs described herein may include lightbulb buttons or other buttons that the user may select for additional tips and/or generic examples FIG. 17 is a block diagram illustrating an example computing device 1700 that is arranged to structure an analytical workflow, arranged in accordance with at least one embodiment described herein. One or more of the TRACE server 102 and the client devices 104, 106, 108 of FIG. 1 may be implemented as the computing device 1700. In a basic configuration 1702, the computing device 1700 typically includes one or more processors 1704 and a system memory 1706. A memory bus 1708 may be used to communicate between the processor 1704 and the system memory 1706.

Depending on the desired configuration, the processor 1704 may be of any type including, but not limited to, a microprocessor (μP), a microcontroller (μC), a digital signal processor (DSP), or any combination thereof. The processor 1704 may include one or more levels of caching, such as a level one cache 1710 and a level two cache 1712, a processor core 1714, and registers 1716. The processor core 1714 may include an arithmetic logic unit (ALU), a floating point unit (FPU), a digital signal processing core (DSP Core), or any combination thereof. An example memory controller 1718 may also be used with the processor 1704, or in some implementations the memory controller 1718 may include an internal part of the processor 1704.

Depending on the desired configuration, the system memory 1706 may be of any type including volatile memory (such as RAM), nonvolatile memory (such as ROM, flash memory, etc.), or any combination thereof. The system memory 1706 may include an operating system 1720, one or more applications 1722, and program data 1724. The application 1722 may include a TRACE application 1726 that may include or correspond to the TRACE application 114, 200 of FIGS. 1-2 described herein. The program data 1724 may include problem files 1728 (which may include or correspond to the problem files 120 of FIG. 1) as is described herein. In some embodiments, the application 1722 may be arranged to operate with the program data 1724 on the operating system 1720 such that one or more methods may be provided as described herein.

The computing device 1700 may have additional features or functionality, and additional interfaces to facilitate communications between the basic configuration 1702 and any involved devices and interfaces. For example, a bus/interface controller 1730 may be used to facilitate communications between the basic configuration 1702 and one or more data storage devices 1732 via a storage interface bus 1734. The data storage devices 1732 may be removable storage devices 1736, non-removable storage devices 1738, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 1706, the removable storage devices 1736, and the non-removable storage devices 1738 are examples of computer storage media or non-transitory computer-readable media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other non-transitory medium which may be used to store the desired information and which may be accessed by the computing device 1700. Any such computer storage media or non-transitory computer-readable media may be part of the computing device 1700.

The computing device 1700 may also include an interface bus 1740 to facilitate communication from various interface devices (e.g., output devices 1742, peripheral interfaces 1744, and communication devices 1746) to the basic configuration 1702 via the bus/interface controller 1730. The output devices 1742 include a graphics processing unit 1748 and an audio processing unit 1750, which may be configured to communicate to various external devices such as a display or speakers via one or more A/V ports 1752. Diagrams, flowcharts, organizational charts, connectors, and/or other graphical objects generated by the diagram application 1726 may be output through the graphics processing unit 1748 to such a display. The peripheral interfaces 1744 include a serial interface controller 1754 or a parallel interface controller 1756, which may be configured to communicate with external devices such as input devices (e.g., keyboard, mouse, open, voice input device, touch input device, etc.), sensors, or other peripheral devices (e.g., printer, scanner, etc.) via one or more I/O ports 1758. Such input devices may be operated by a user to provide input to the diagram application 1726, which input may be effective to, e.g., generate curved connectors, designate points as designated points of one or more curved connectors, relocate one or more designated points, and/or to accomplish other operations within the diagram application 1726. The communication devices 1746 include a network controller 1760, which may be arranged to facilitate communications with one or more other computing devices 1762 over a network communication link via one or more communication ports 1764.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 1700 may be implemented as a portion of a small-form factor portable (or mobile) electronic device such as a smartphone, a personal data assistant (PDA) or an application-specific device. The computing device 1700 may also be implemented as a personal computer including tablet computer, laptop computer, and/or non-laptop computer configurations, or a server computer including both rack-mounted server computer and blade server computer configurations.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method to structure an analytical workflow that improves reasoning based on a problem context and demonstrated abilities of each individual user, the method comprising:
   displaying a reasoning problem to an analyst;
   receiving input from the analyst to identify a reasoning problem type of the reasoning problem;

providing a recommended analytic approach for the reasoning problem type to the analyst;
assisting the analyst in analyzing and evaluating one or more information sources relevant to the reasoning problem;
guiding the analyst through a structured technique (ST) to support reasoning of the analyst in formulation of a solution to the reasoning problem; and
generating a report that includes the analyst's solution to the reasoning problem based on input from the analyst.

2. The method of claim 1, further comprising one of the following prior to displaying the recommended analytic approach for the reasoning problem type to the analyst:
automatically generating the recommended analytic approach based on the reasoning problem type; or
receiving the recommended analytic approach from a plurality of analysts.

3. The method of claim 1, further comprising influencing cognitive behaviors of the analyst to reduce a number of trivial decisions and/or logical pitfalls of the analyst and/or to mitigate common cognitive errors in rational problem analysis by the analyst by at least one of:
facilitating stigmergic communication among a plurality of analysts that includes the analyst;
nudging the analyst to at least one of: consider additional information, complete a second ST, or provide feedback that relates to the analyst's reasoning; and
providing the analyst with one or more annotation tools to annotate the one or more information sources in the analysis and evaluation of the one or more information sources.

4. The method of claim 3, wherein facilitating stigmergic communication comprises:
aggregating prior evaluation input of the one or more information sources from a plurality of analysts; and
displaying to the analyst the prior evaluation input from the plurality of analysts in context with the one or more information sources such that the analyst's reasoning builds on the prior evaluation input.

5. The method of claim 3, wherein facilitating stigmergic communication comprises:
aggregating prior ST input received from a plurality of analysts guided previously through the ST for the same reasoning problem; and
displaying to the analyst the prior ST input from the plurality of analysts such that the analyst's completion of the ST builds on the prior ST input.

6. The method of claim 1, wherein assisting the analyst in analyzing and evaluating the one or more information sources comprises providing the analyst with one or more annotation tools to annotate the one or more information sources, the one or more annotation tools configured to:
highlight a portion of the one or more information sources;
tag an item described in the one or more information sources as an actor, event, fact, or assumption; tag an item described in the one or more information sources with a custom tag created by the analyst;
store an evaluation by the analyst of a relevance and credibility of the one or more information sources; and
store a comment of the analyst that connects an opinion of the analyst to a portion of the one or more information sources.

7. The method of claim 1, wherein guiding the analyst through the ST includes at least one of:
guiding the analyst through generation of multiple hypotheses;
guiding the analyst through a structured debate in which the analyst is guided to generate first arguments in support of a hypothesis supported by the one or more information sources and to generate second arguments against the hypothesis;
guiding the analyst through consideration of pros and cons of a hypothesis supported by the one or more information sources;
guiding the analyst through an Analysis of Competing Hypotheses (ACH) ST in which the analyst is guided to generate and analyze multiple different hypotheses; and
guiding the analyst through a Key Assumptions Check (KAC) ST in which the analyst is guided to critically evaluate and examine assumptions underlying a judgment.

8. The method of claim 1, further comprising displaying a report checklist to the analyst that identifies at least one of features of the analyst's reasoning to be made explicit for an external audience to understand the analyst's solution to the reasoning problem; justifications for the analyst's solution; alternative hypotheses considered by the analyst; and assumptions made by the analyst that could change the analyst's solution if the assumptions are incorrect.

9. The method of claim 1, further comprising:
displaying a given one of the one or more information sources in a first portion of a user interface;
simultaneously displaying at least some annotations of the analyst in a second portion of the same user interface.

10. The method of claim 9, wherein each annotation is associated with a corresponding portion of the one or more information sources, the method further comprising:
aggregating annotations of the analyst in the second portion of the user interface; and
in response to selection of a given annotation from the second portion of the user interface, automatically displaying the corresponding portion of the one or more information sources in the first portion of the user interface.

11. The method of claim 1, wherein:
providing the recommended analytic approach comprises providing a recommended ST to the analyst; and
guiding the analyst through the ST comprises guiding the analyst through the recommended ST.

12. The method of claim 1, wherein generating the report that includes the analyst's solution to the reasoning problem based on input from the analyst comprises providing a report template to the analyst, the report template including a plurality of sections each configured to receive input from the analyst.

13. The method of claim 12, further comprising receiving input from the analyst in each of the plurality of sections of the report template, including receiving at least one of the following from the analyst:
a final judgment, conclusion, or recommendation of the analyst;
a justification of the final judgment, conclusion, or recommendation of the analyst;
a discussion of alternative hypotheses; and
a final probability assessment of the final judgment.

14. A computer-implemented method to structure an analytical workflow that improves reasoning based on a problem context and demonstrated abilities of each individual user, the method comprising:
displaying a reasoning problem to an analyst;
receiving input from the analyst to identify a reasoning problem type of the reasoning problem;

providing a recommended analytic approach for the reasoning problem type to the analyst; and facilitating stigmergic communication among a plurality of analysts that includes the analyst while at least one of:

assisting the analyst in analyzing and evaluating one or more information sources relevant to the reasoning problem;

guiding the analyst through a structured technique (ST) to support reasoning of the analyst in formulation of a solution to the reasoning problem; and generating a report that includes a solution to the reasoning problem based on input from one or more of the plurality of analysts.

15. The method of claim 14, wherein facilitating the stigmergic communication comprises at least one of:

aggregating prior evaluation input of the one or more information sources from the plurality of analysts and displaying to the analyst the prior evaluation input from the plurality of analysts in context with the one or more information sources such that the analyst's reasoning builds on the prior evaluation input; and aggregating prior ST input received from the plurality of analysts guided previously through the ST for the same reasoning problem and displaying to the analyst the prior ST input from the plurality of analysts such that the analyst's completion of the ST builds on the prior ST input.

16. The method of claim 14, wherein facilitating the stigmergic communication comprises at least one of:

aggregating evaluation input of the one or more information sources from the plurality of analysts in real time and displaying the aggregated evaluation input to each of the plurality of analysts in real time;

aggregating ST input from the plurality of analysts in real time while the plurality of analysts are guided through the ST and displaying the aggregated ST input to each of the plurality of analysts in real time.

17. The method of claim 14, wherein generating the report that includes the solution to the reasoning problem based on input from one or more of the plurality of analysts comprises one of:

generating the report that includes the analyst's solution to the reasoning problem based on input from the analyst; and generating a single report for the plurality of analysts that includes a crowd-based solution to the reasoning problem based on input from the one or more of the plurality of analysts.

18. The method of claim 14, further comprising nudging the analyst to at least one of: consider additional information, complete a second ST, or provide feedback that relates to the analyst's reasoning.

19. The method of claim 14, wherein guiding the analyst through the ST includes at least one of:

guiding the analyst through generation of multiple hypotheses;

guiding the analyst through a structured debate in which the analyst is guided to generate first arguments in support of a hypothesis supported by the one or more information sources and to generate second arguments against the hypothesis;

guiding the analyst through consideration of pros and cons of a hypothesis supported by the one or more information sources;

guiding the analyst through an Analysis of Competing Hypotheses (ACH) ST in which the analyst is guided to generate and analyze multiple different hypotheses; and guiding the analyst through a Key Assumptions Check (KAC) ST in which the analyst is guided to critically evaluate and examine assumptions underlying a judgment.

20. The method of claim 14, wherein:

providing the recommended analytic approach comprises providing a recommended ST to the analyst; and guiding the analyst through the ST comprises guiding the analyst through the recommended ST.

* * * * *